(12) United States Patent
Zhou et al.

(10) Patent No.: US 12,543,758 B2
(45) Date of Patent: Feb. 10, 2026

(54) SYSTEMS AND METHODS FOR PROTEIN RECOVERY

(71) Applicant: Solecta, Inc., Oceanside, CA (US)

(72) Inventors: Meijuan Zhou, Oceanside, CA (US); Sanjay R. Srivatsa, Walnut Creek, CA (US)

(73) Assignee: Solecta, Inc., Oceanside, CA (US)

( * ) Notice: Subject to any disclaimer, the term of this patent is extended or adjusted under 35 U.S.C. 154(b) by 470 days.

(21) Appl. No.: 18/302,260

(22) Filed: Apr. 18, 2023

(65) Prior Publication Data

US 2023/0380444 A1 Nov. 30, 2023

Related U.S. Application Data

(63) Continuation of application No. PCT/US2021/055888, filed on Oct. 20, 2021.
(Continued)

(51) Int. Cl.
| | |
|---|---|
| *A23J 1/12* | (2006.01) |
| *B01D 61/02* | (2006.01) |
| *B01D 61/14* | (2006.01) |
| *B01D 61/58* | (2006.01) |
| *B01D 63/12* | (2006.01) |

(Continued)

(52) U.S. Cl.
CPC .............. *A23J 1/12* (2013.01); *B01D 61/027* (2013.01); *B01D 61/145* (2013.01); *B01D 61/58* (2013.01); *B01D 63/12* (2013.01); *B01D 71/34* (2013.01); *B01D 71/68* (2013.01); *B02C 9/04* (2013.01); *B01D 2317/025* (2013.01)

(58) Field of Classification Search
CPC ......... A23J 1/12; B01D 61/027; B01D 61/14; B01D 61/145; B02C 23/08
See application file for complete search history.

(56) References Cited

U.S. PATENT DOCUMENTS 5,968,585 A 10/1999 Liaw et al.

FOREIGN PATENT DOCUMENTS

| CN | 103710415 A | 4/2014 |
| CN | 104322856 A | 2/2015 |

(Continued)

OTHER PUBLICATIONS

Gao, Wu et al—CN 105949276 A machine translation—Sep. 21, 2016 (Year: 2016).*

(Continued)

*Primary Examiner* — Bradley R Spies
(74) *Attorney, Agent, or Firm* — WILSON SONSINI GOODRICH & ROSATI

(57) ABSTRACT

The present disclosure provides systems and methods for the recovery of protein species from wet mill grain process streams. Systems and methods of the present disclosure may be integrated with a wet mill grain process to separate out protein species that may limit efficiency of the grain process and produce one or more product streams comprising these separated protein species. A feed stream may be fractionated by at least two membranes into retentate and permeate streams. Removing larger proteins through the membrane fractionation may allow previously soluble prolamin products in the permeate stream(s) to precipitate. The recovered protein species may include prolamin, such as zein from a corn grain feed.

20 Claims, 6 Drawing Sheets

Related U.S. Application Data

(60) Provisional application No. 63/094,815, filed on Oct. 21, 2020.

(51) Int. Cl.
  *B01D 71/34* (2006.01)
  *B01D 71/68* (2006.01)
  *B02C 9/04* (2006.01)

(56) References Cited

FOREIGN PATENT DOCUMENTS

| CN | 105949276 A | 9/2016 |
| --- | --- | --- |
| CN | 104672299 B | 4/2020 |
| WO | WO-03033541 A1 | 4/2003 |
| WO | WO-2006119206 A2 | 11/2006 |
| WO | WO-2022087158 A1 | 4/2022 |

OTHER PUBLICATIONS

EP20210883824.1 Extended European Search Report dated Aug. 27, 2024.
Khan, Nasr Ullah. et al. An update on the maize zein-gene family in the post-genomics era. Food Production, Processing and Nutrition 1:13, 1-12 (2019).
PCT/US2021/055888 International Preliminary Report on Patentability dated Apr. 13, 2023.
PCT/US2021/055888 International Search Report and Written Opinion dated Feb. 10, 2022.

\* cited by examiner

SYSTEMS AND METHODS FOR PROTEIN RECOVERY

CROSS-REFERENCE

The present application is a continuation of International Patent Application No. PCT/US2021/55888, filed Oct. 20, 2021, which claims the benefit of U.S. Provisional Patent Application No. 63/094,815, filed Oct. 21, 2020, which is herein incorporated by reference in its entirety.

BACKGROUND

Grain processing generally utilizes mechanical separation steps, such as filtration and gravity separations to separate the valuable human and animal food products in the grains, such as germ and gluten meal, and to produce valuable starch slurries that are used in downstream fermentation. The overflow from such a process may include desirable protein species and other compounds. Currently, these processes lose a significant portion of the valuable protein constituents contained in the grains. While these separation processes effectively capture macro-sized constituents, they are not effective in capturing fine particulates, colloidal or soluble protein species, such as lower molecular weight glutens and prolamins.

SUMMARY

In conventional grain processing steps (e.g., corn wet mill processes), the overflow from the mechanical separations containing these fine protein particulates often find their way to the grain steep process, where they occupy unfermentable process capacity and thus limit overall grind rates. In some situations, streams containing fine particulates, colloidal or soluble species are intentionally discharged from the wet mill corn processes to avoid restricting fermentation capacity and to avoid problems in downstream processing. In current corn wet mill processes, for example, lower molecular weight glutens can be lost and practically none of the corn prolamin, zein, is recovered. Thus, there remains a need for a cost-effective approach to capture the valuable ingredients (e.g., grain proteins) contained in these fine particle, colloidal and soluble streams.

Prolamins, such as zein in corn, are characterized by a high glutamine and proline content and by poor solubility in water. They are soluble in alcohols and recovery processes have been developed using alcohol extraction. However, this introduces an organic solvent which may also need be recovered, and which increases process complexity and introduces waste treatment issues. Thus, there remains a need for a protein recovery process which avoids the need for organic solvents.

Prolamin proteins, such as zein in corn, are a valuable by-product of grain processing. Taking corn wet mill processes as an example, a series of complicated steps can be required to recover zein proteins in a pure form. The current price of purified zein is $20-70 per kg depending on the grade and purity. This price limits the use of zein proteins to specialty applications that can tolerate the high price, such as pharmaceutical tablet coatings or confectionary coatings. Zein is currently an uneconomical material for large industrial uses such as biodegradable plastics. Thus, there remains a need for cost effective approach to recover zein and other prolamin proteins.

Provided herein are methods and systems for recovering valuable ingredients (e.g., proteins) from a stream (e.g., an overflow from mechanical separations) derived from a grain processing unit (e.g., a wet mill grain process). In an aspect, the methods and systems provided herein comprise a feed stream which comprises a first set of proteins and a second set of proteins. The first set of proteins may have an average molecular weight greater than about 100 kilodalton (kDa) and/or an average particle size between about 0.05 micrometers and about 0.2 micrometers. The second set of proteins may have an average molecular weight of less than about 75 kDa and/or an average particle size less than about 20 nanometers (nm). In some cases, the methods and systems provided herein comprise a first separation process comprising a first membrane, and a second separation process comprising a second membrane. The methods and systems provided herein may generate a first retentate stream, a first permeate stream, a second retentate stream and/or a second permeate stream. The first retentate stream may comprise the first set of proteins. The second retentate stream may comprise the first set of proteins. The second permeate stream may comprise the second set of proteins. The methods and systems provided herein may allow for greater than 90% recovery of prolamin from the feed stream. The methods and systems provided herein may allow for recovery of one or more protein species from one or more of the first retentate stream, first permeate stream, second retentate stream, or second permeate stream.

In an aspect, the present disclosure provides a method of recovering fine particulate, or protein species from a feed from a wet mill grain process, the method comprising: (a) subjecting the feed from the wet mill grain process to a first separation process utilizing a first membrane under conditions effective to provide a first retentate stream comprising one or more higher molecular weight proteins having an average molecular weight of greater than 75 kilodalton and a first permeate stream comprising one or more lower molecular weight proteins having an average molecular weight of less than 75 kilodalton; and (b) subjecting the first permeate stream to a second separation process utilizing a second membrane under conditions effective to provide a second retentate stream comprising glutens and a second permeate stream comprising prolamins.

In some embodiments, the first membrane comprises a microporous membrane.

In some embodiments, the first membrane comprises an ultrafiltration membrane.

In some embodiments, the second membrane comprises a nanofiltration membrane.

In some embodiments, the one or more lower molecular weight proteins comprise glutens or prolamins.

In some embodiments, the one or more lower molecular weight proteins comprise glutens and prolamins.

In some embodiments, the method further comprises an additional separation process utilizing at least one spiral wound membrane element.

In some embodiments, the method further comprises an additional separation process utilizing at least two spiral wound membrane elements in series.

In some embodiments, the at least two spiral wound membrane elements are in parallel.

In some embodiments, the one or more higher molecular weight proteins comprise glutens.

In some embodiments, the method further comprises directing the second permeate stream to pass through a nanofiltration membrane unit to recover protein species comprising prolamins.

In some embodiments, an ultrafiltration step precedes the nanofiltration step of the nanofiltration membrane unit.

In some embodiments, recovery of a stream comprising prolamins is increased by removal of a stream comprising glutens.

In some embodiments, the method further comprises recovering one or more protein species or non-protein species from at least one of (i) the first retentate stream, (ii) the first permeate stream, (iii) the second retentate stream, and (iv) the second permeate stream.

In some embodiments, the recovered protein species comprise glutelins, prolamins or glutens.

In some embodiments, the recovered non-protein species comprise carbohydrates, starches, enzymes, alcohols, aldehydes, fats or other low molecular weight organic species.

In some embodiments, a grain feed to the wet mill grain process comprises corn, wheat, barley, rye, oats, or rice.

In some embodiments, the feed from the wet mill grain process to the first separation process is supplied from an overflow of a mechanical separation device or gravity separation device.

In some embodiments, the feed from the wet mill grain process is an aqueous stream with no added organic solvent.

In some embodiments, the first membrane comprises a low fouling spiral wound membrane comprising at least one polysulfone, polyvinyl difluoride, polyethersulfone, polyacrylonitrile, or polyetherimide.

In some embodiments, the first membrane material comprises polysulfone, polyvinyl difluoride, or polyethersulfone.

In some embodiments, the second membrane comprises a nanofiltration membrane which is a low fouling spiral wound membrane comprising at least one polysulfone, polyvinyl difluoride, polyethersulfone, polyacrylonitriles, or polyetherimide material as a microporous substrate and comprises a top interfacial coating or separation layer.

In some embodiments, the second membrane comprises a nanofiltration membrane material comprising a microporous polysulfone membrane as substrate and a top interfacial crosslinked polyamide layer.

In some embodiments, the spiral wound membrane elements include a spacer element with a thickness equal to or between 30 mils and 270 mils thickness.

In some embodiments, the spiral wound membrane elements include a spacer element with a thickness equal to or between 30 mils and 135 mils thickness.

In some embodiments, the first separation process or the second separation process is operated at a feed pressure of 15 pounds per square inch gauge (psig) to 200 psig.

In some embodiments, a nominal pore size of the first membrane is between about 0.02 microns and 0.50 microns.

In some embodiments, a nominal pore size of the first membrane is between about 0.05 microns and 0.20 microns.

In some embodiments, the first retentate stream comprises at least 90% of the insoluble particulates greater than 0.5 microns (or micrometer) in diameter.

In some embodiments, a reject stream from the first membrane comprises 5% to 70% of high molecular weight solubles and fine particulates greater than 0.5 microns in size.

In some embodiments, the second membrane is a nanofiltration membrane.

In some embodiments, a nominal pore size of the nanofiltration membrane is less than about 20 nanometers.

In some embodiments, the nanofiltration membrane is a thin composite membrane.

In some embodiments, the thin film composite nanofiltration membrane comprises a microporous membrane substrate with a pore size in between about 0.05 microns and 0.2 microns.

In some embodiments, thin film composite nanofiltration membrane comprises a top nanoporous polymer layer of pore size less than about 20 nanometers, or with a molecular weight cut-off less than 5000.

In some embodiments, the thin film composite nanofiltration membrane comprises a top nanoporous polymer layer produced by a dip-coating or interfacial polymerization process.

In some embodiments, the nanofiltration membrane is formed directly using a phase inversion process.

In some embodiments, the nanofiltration membrane removes at least 80% of the low molecular weight solubles in the first permeate stream.

In some embodiments, a temperature of the overflow stream and the first or second separation process is between about 25° C. and 65° C.

In some embodiments, a recovery stream comprises greater than 10% of low molecular weight proteins as originally comprised in the feed from the wet mill grain process.

In some embodiments, a recovery stream comprises about 1 to 99% of the prolamin contained in the feed from the wet mill grain process.

In some embodiments, the first microporous membrane has a molecular weight cut-off (MWCO) in the range of 2,000 to 5,000.

In some embodiments, the first microporous membrane has a MWCO less than 5,000.

In some embodiments, the second microporous membrane has a MWCO in the range of 2,000 to 5,000.

In some embodiments, the second microporous membrane has a MWCO less than 5,000.

In another aspect, the present disclosure provides a process integrated with a wet mill grain preprocess, comprising (a) receiving from the wet mill grain preprocess a stream as a feed to one or more separation processes which comprise at least an ultrafiltration process and a nanofiltration process; (b) subjecting the feed to the ultrafiltration process utilizing a microporous membrane to generate a first retentate stream comprising higher molecular weight proteins comprising glutens and a first permeate stream comprising prolamins, wherein the higher molecular weight proteins have an average molecular weight of greater than 75 kDa; (c) directing the first permeate stream to the nanofiltration process to generate a second retentate stream comprising lower molecular weight proteins comprising glutens and a second permeate stream comprising the prolamins, wherein the lower molecular weight proteins have an average molecular weight of less than about 75 kDa; (d) recovering the prolamins from the second permeate stream; and (e) returning at least a portion of the second permeate stream to the wet mill grain preprocess.

In some embodiments, the process further comprises returning the first retentate stream to the wet mill grain preprocess or recovering from the first retentate stream the glutens In some embodiments, recovering the glutens comprises the use of a separation device and returning a liquid stream from the separation device to the wet mill grain preprocess.

In some embodiments, the process further comprises returning the second retentate stream to the wet mill grain preprocess or recovering from the second retentate stream the glutens.

In some embodiments, recovering the glutens from the second retentate stream comprises the use of a separation device and returning a liquid stream from the separation device to the wet mill grain preprocess.

In some embodiments, the recovering of (d) comprises the use of a separation device comprising a spray dryer, decanter, centrifuge, filter, membrane element, or any combination thereof.

In some embodiments, the stream is from an overflow from a mechanical separation device.

In some embodiments, the nanofiltration process utilizes a nanofiltration membrane.

In another aspect, the present disclosure provides a process integrated with a wet mill grain preprocess, comprising: (a) receiving from the wet mill grain preprocess a stream as a feed one or more filtration processes comprising at least a first membrane filtration process and a second membrane filtration process; (b) subjecting the feed to the first membrane filtration process utilizing a microporous membrane to generate a first retentate stream comprising higher molecular weight glutens having an average molecular weight of at least about 75 kDa and a first permeate stream comprising prolamins; (c) directing the first permeate stream to the second membrane filtration process to generate a second retentate stream comprising lower molecular weight glutens having an average molecular weight of less than about 75 kDa and a second permeate stream comprising the prolamins; (d) recovering the prolamins from the second permeate stream; and (e) returning at least a portion of the second permeate stream to the wet mill grain preprocess.

In some embodiments, the process further comprises returning the first retentate stream to the wet mill grain preprocess or recovering from the first retentate stream the higher molecular weight glutens.

In some embodiments, recovering the higher molecular weight glutens comprises the use of a separation device and returning a liquid stream from the separation device to the wet mill grain preprocess.

In some embodiments, the process further comprises returning the second retentate stream to the wet mill grain preprocess or recovering from the second retentate stream the lower molecular weight glutens.

In some embodiments, recovering the lower molecular weight glutens from the second retentate stream comprises the use of a separation device and returning a liquid stream from the separation device to the wet mill grain preprocess.

In some embodiments, the recovering of (d) comprises the use of a separation device comprising a spray dryer, decanter, centrifuge, filter, membrane element, or any combination thereof.

In some embodiments, the stream is from an overflow stream from a mechanical separation device.

In some embodiments, the wet mill grain preprocess is a corn, wheat, barley, rye, sorghum or oat wet mill preprocess.

In some embodiments, the wet mill grain preprocess is a steep process.

In some embodiments, overflow stream from the mechanical separation device in the wet mill grain preprocess is an overflow from a thickener, decanter or centrifuge or a filtrate from a filter.

In some embodiments, the total solids contained in an overhead stream from the wet mill grain preprocess contains less than 5% solids.

In some embodiments, the stream from the wet mill grain preprocess is in fluid communication with the microporous membrane utilized in the first membrane filtration process and the first retentate stream is in fluid communication with the wet mill grain preprocess or at least one separation device.

In some embodiments, a liquid stream from the at least one separation device is in fluid communication with the wet mill grain preprocess.

In some embodiments, the first permeate stream from the first membrane filtration process is in fluid communication with a nanofiltration membrane utilized in the second membrane filtration process.

In some embodiments, the second retentate stream from the nanofiltration membrane is in fluid communication with the wet mill grain process or at least one separation device.

In some embodiments, a liquid stream from the at least one separation device in the second membrane filtration process is in fluid communication with the wet grain preprocess.

In some embodiments, recovery of a stream comprising prolamins is increased by removal of a stream comprising glutens.

In some embodiments, the process further comprises recovering one or more protein species or non-protein species from at least one of (i) the first retentate stream, (ii) the first permeate stream, (iii) the second retentate stream, and (iv) the second permeate stream.

In some embodiments, the recovered protein species comprise glutelins, prolamins, or glutens.

In some embodiments, the recovered non-protein species comprise carbohydrates, starches, enzymes, alcohols, aldehydes, fats, or other low molecular weight organic species.

In some embodiments, the second retentate stream and the second permeate stream comprising the glutens and prolamins from the second membrane filtration process are recovered by centrifugation, spray-drying, decanting, filtration, or an additional membrane step.

In some embodiments, the recovered prolamins are further purified to provide high molecular weight prolamin products having an average molecular weight of between about 10 kDa and about 50 kDa.

In some embodiments, the microporous membrane is a low fouling spiral wound membrane comprising at least one polysulfone, polyethersulfone, or polyvinyl difluoride membrane element.

In some embodiments, nominal pore size range for the microporous membrane is equal to or between 0.1 microns and 2 microns.

In some embodiments, a nominal pore size range for the microporous membrane is equal to or between 0.05 microns and 0.20 microns.

In some embodiments, the first membrane filtration process or the second membrane filtration process comprises elements having spacers of equal to or between 30 and 270 mils thickness.

In some embodiments, the first retentate stream comprises at least 90% of insoluble particulates greater than 0.5 micron in diameter.

In some embodiments, a reject stream from the microporous membrane comprises equal to or between 5.0% and 70% of the high molecular weight solubles and fine particulates larger than 0.5 microns in diameter.

In some embodiments, the second membrane filtration process utilizes a nanofiltration membrane which is a low fouling spiral wound membrane comprised of at least one of polysulfone, polyvinyl difluoride, polyethersulfone, polyacrylonitrile, and polyetherimide.

In some embodiments, the nanofiltration membrane is a low fouling spiral wound membrane comprised of at least one of polysulfone or polyvinyl difluoride.

In some embodiments, a nominal pore size of the nanofiltration membrane is less than or equal to 10 nm.

In some embodiments, a nominal pore size of the nanofiltration membrane is less than or equal to 5 nm.

In some embodiments, the nanofiltration membrane is a thin film composite membrane.

In some embodiments, the thin film composite membrane comprises a microporous membrane substrate with pore size in the range of 0.05 micron to 0.2 microns.

In some embodiments, the thin film composite membrane comprises a top nanoporous polymer layer of pore size less than 20 nm or with a molecular weight cut-off less than 5000.

In some embodiments, the thin film composite membrane comprises a top nanoporous polymer layer produced by a dip-coating or interfacial polymerization process.

In some embodiments, the thin film composite membrane is formed directly using a phase inversion process.

In some embodiments, the nanofiltration membrane removes at least 80% of the low molecular weight solubles in the first permeate stream.

In some embodiments, base materials selected for the microporous and nanofiltration membranes are the same or different.

In some embodiments, a temperature of the overflow stream from the wet mill grain preprocess and the one or more filtration processes are in the range of 25 to 65° C.

In some embodiments, the prolamin recovered is equal to or between 1 and 99% of prolamin contained in the feed.

In another aspect, the present disclosure provides a membrane protein recovery system integrated with a wet mill grain system, the membrane protein recovery system comprising: (a) at least one gluten starch separator; (b) at least one gluten thickener; (c) at least one grain steeping vessel; and (d) at least two spiral wound membranes; wherein at least one of the at least two spiral wound membranes is in fluid contact with the at least one gluten thickener; and wherein at least one of the at least two spiral wound membranes or the at least one gluten starch separator is in fluid contact with the at least one grain steeping vessel.

In some embodiments, the system further comprises at least one microporous membrane in fluid contact with the at least one gluten thickener.

In some embodiments, the system further comprises a separation device in fluid communication with the at least one gluten thickener.

In some embodiments, the system further comprises a separation device in fluid contact with the at least one grain steeping vessel.

In some embodiments, the system further comprises a spray-drying device in fluid contact with the at least one grain steeping vessel, or at least one of the at least two spiral wound membranes.

In another aspect, the present disclosure provides a method for processing a feed stream, comprising: (a) providing the feed stream comprising a first set of proteins having an average molecular weight of greater than 75 kDa and a second set of proteins having an average molecular weight of less than or equal to 75 kDa, which second set of proteins comprises a gluten and a prolamin; (b) bringing the feed stream in contact with a first membrane under conditions sufficient to provide (i) a first retentate stream comprising the first set of proteins and (ii) a first permeate stream comprising the second set of proteins; and (c) bringing the first permeate stream in contact with a second membrane under conditions sufficient to provide a second retentate stream comprising the gluten and a second permeate stream comprising the prolamin.

In some embodiments, the first membrane comprises pores having a first average pore size and the second membrane comprises pores having a second average pore size, where the first average pore size is greater than the second average pore size.

In some embodiments, the feed stream is generated from a wet mill grain process.

In some embodiments, a grain feed of the wet mill grain process comprises corn, wheat, barley, rye, oats, or rice.

In some embodiments, the feed stream is supplied from a mechanical separation device or a gravity separation device.

In some embodiments, the first membrane is a spiral wound membrane.

In some embodiments, the second membrane is a spiral wound membrane.

In some embodiments, the feed stream is an aqueous stream with no added organic solvent.

In some embodiments, the first membrane comprises one or more of polysulfone, polyvinyl difluoride, polyethersulfone, polyacrylonitrile, and polyetherimide.

In some embodiments, the second membrane comprises one or more of polysulfone, polyvinyl difluoride, polyethersulfone, polyacrylonitrile, and polyetherimide.

In some embodiments, the second membrane comprises a microporous membrane substrate and a top interfacial cross-linked polyamide layer.

In some embodiments, the first set of proteins has an average molecular weight of greater than 100 kDa.

In some embodiments, the first set of proteins has an average molecular weight of between about 75 kDa and 100 kDa.

In some embodiments, the first membrane is a spiral wound membrane comprising at least one spacer element with a thickness between about 30 mils and 135 mils.

In some embodiments, the first average pore size is between about 0.02 micrometers and about 0.5 micrometers.

In some embodiments, the second average pore size is less than about 50 micrometers.

In some embodiments, the second average pore size is less than about 20 micrometers.

In some embodiments, the first membrane has an average molecular weight cut off of between about 2 kDa and about 500 kDa.

In some embodiments, the first membrane has an average molecular weight cut off of between about 100 kDa and about 200 kDa.

In some embodiments, the feed stream further comprises fine particulates, and the first retentate stream comprises between about 5% to 70% of the fine particulates greater than 0.5 micrometers in diameter.

In some embodiments, the feed stream comprises insoluble particulates and the first retentate stream comprises at least 90% of the insoluble particulates greater than 0.5 micrometers in diameter.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

Figure 1:
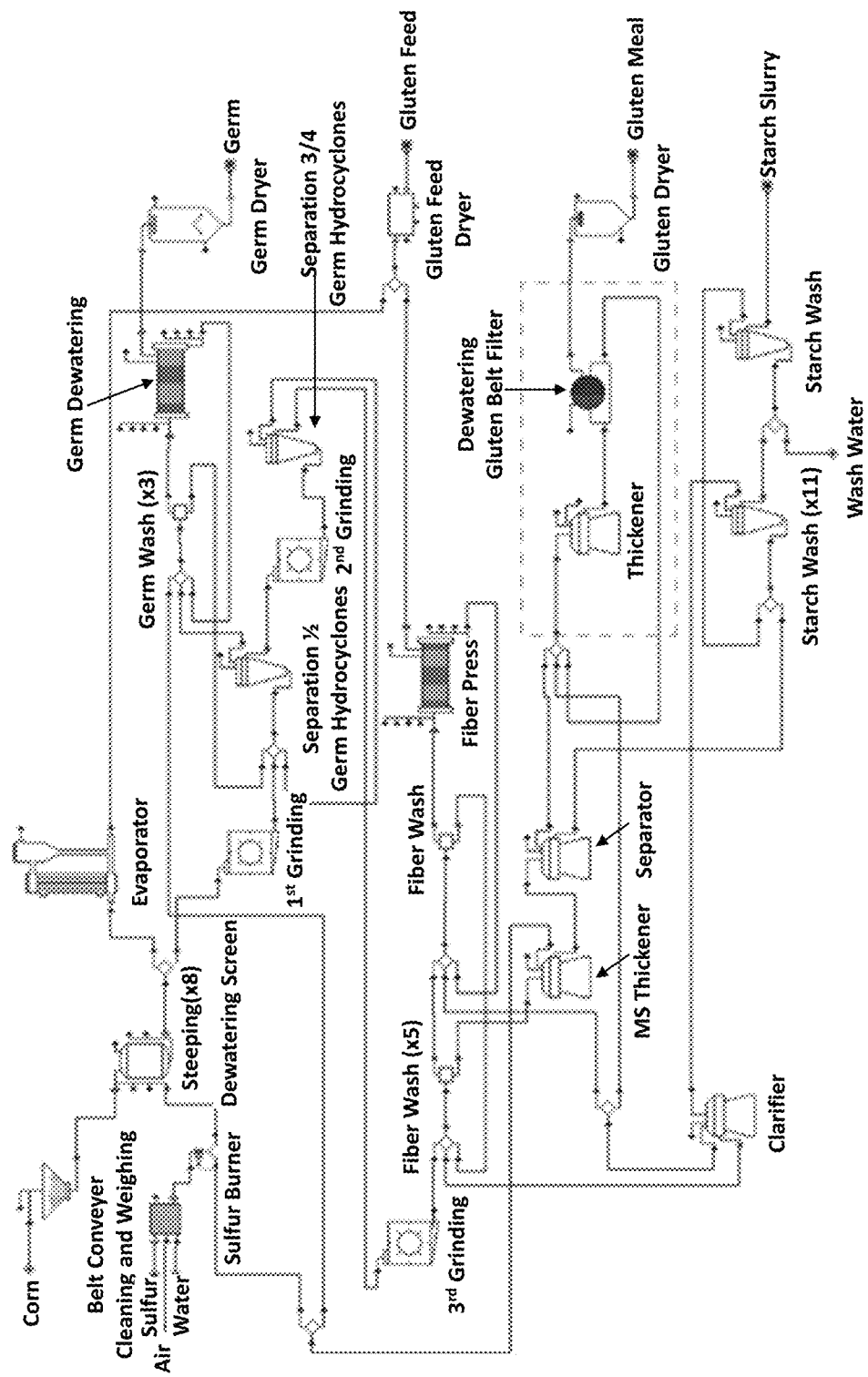
FIG. 1 provides a generalized process flow diagram of a wet mill grain process, showing recovery of germ, gluten meal and starch.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Whenever the term "at least," "greater than," or "greater than or equal to" precedes the first numerical value in a series of two or more numerical values, the term "at least" or "greater than" applies to each one of the numerical values in that series of numerical values.

Whenever the term "no more than," "less than," or "less than or equal to" precedes the first numerical value in a series of two or more numerical values, the term "no more than" or "less than" applies to each one of the numerical values in that series of numerical values.

The term "about" or "nearly" as used herein generally refers to within (plus or minus) 15%, 10%, 9%, 8%, 7%, 6%, 5%, 4%, 3%, 2%, or 1% of a designated value.

As used herein, the singular forms "a", "an", and "the" include plural references unless the context clearly dictates otherwise.

In an aspect, the present disclosure provides methods and systems which facilitate recovery of valuable ingredients comprising proteins from a grain process (e.g., a wet mill grain process). The methods and systems may comprise the use of a membrane fractionation process. Membrane fractionation may comprise a series of membrane fractionation steps (e.g., greater than or equal to about 2, 3, 4, 5, 6, 7, 8, 9, 10 membrane fractionation steps, or more) in which the membrane materials are selected to maximize the recovery of target protein species and ensure high efficiency and selectivity in rejection. Proper selection of membrane fractionation steps can provide selective protein fractionation.

In an aspect, the present disclosure provides a process for recovery of a species (e.g., gluten, prolamin, or other protein) that may not, or need not, require the addition of other chemicals (e.g., alcohol). The process may not, or need not, involve the use of an organic solvent, such as ethanol or other aliphatic alcohols, to recover gluten and/or prolamin proteins. In another aspect, a process of the present disclosure may not, or need not, require a pH adjustment step to recover gluten and/or prolamins proteins. In some cases, adjusting a pH of a stream may be advantageous to enhance protein recovery.

The protein recovery process and the equipment of the present disclosure are relatively simple and readily scalable, as compared to other process technologies that have been evaluated or commercialized to recover low molecular weight glutens and prolamins from wet mill grain process streams that contains fine particulates, colloidal or soluble forms of proteins. Thus, the simplicity and scalability of the protein recovery process provides an economic route to recover valuable protein streams, in particular lower molecular weight glutens and prolamins, as well as providing an economic route to produce high purity prolamin products. The protein recovery process offers the opportunity to develop new, higher volume markets for these prolamin products, e.g., the production of biodegradable plastic products.

In some aspects, the protein recovery process of this disclosure may be collocated and/or integrated into one or more commercial wet mill grain processes. In some embodiments, the wet mill grain processes may produce streams comprising fine particulate, colloidal or soluble proteins. In some embodiments these streams from wet mill grain processes may be feed streams for the separation processes of the present disclosure.

In an aspect, the present disclosure provides a method of producing high-value gluten and prolamin products, and pure prolamin products, from streams comprising proteins present as fine particulates, colloidal species or soluble species. In some cases, these proteins present as fine particulates, colloidal species or soluble species are of low value or are lost to waste treatment without the process of the present disclosure.

In an aspect, the present disclosure provides a method of recovering fine particulate or protein species from a feed from a wet mil grain process. In some cases, the method comprises (a) subjecting the feed from the wet mill process to a first separation process utilizing a first membrane under conditions effective to provide a first retentate stream comprising one or more higher molecular weight proteins having an average molecular weight of greater than 75 kDa and a first permeate stream comprising one or more lower molecular weight proteins having an average molecular weight of less than 75 kDa, and (b) subjecting the first permeate stream to a second separation process utilizing a second membrane under conditions effective to provide a second retentate stream comprising glutens and a second permeate stream comprising prolamins.

When a feed inlet stream (e.g. the feed stream) enters a membrane module (e.g. an ultrafiltration or nanofiltration process) it may be separated into two streams: a permeate stream which passes through the membrane, and a retentate stream which does not pass through the membrane and is retained on the feed side of the membrane.

In some cases, the first membrane may comprise a microporous membrane, an ultrafiltration membrane, or a nanofiltration membrane. In some cases, the second membrane may comprise an ultrafiltration membrane or a nanofiltration membrane. One or more of the first membrane, second membrane, microporous membrane, ultrafiltration membrane, and nanofiltration membrane may comprise at least one spiral wound membrane element. In some cases, the first and/or second separation process may utilize at least one spiral wound membrane element. In some cases, one or both of the first and second separation processes may utilize at least two membrane elements. The at least two membrane elements may be in parallel. Alternatively, the at least two membrane elements may be in series.

In some cases, the first separation process may comprise a first membrane. In some cases, the first separation product and/or the first membrane may produce a first retentate stream. In some cases, the first retentate stream may comprise a first product stream. In some cases, the first separation process and/or the first membrane may produce a permeate stream (e.g., a first permeate stream).

In some cases, the permeate stream (e.g., first permeate stream) is subjected to a second separation process comprising a second membrane. The second separation process may produce a second retentate stream. The second retentate stream may comprise a second product stream. The second separation process may produce a second permeate stream. The second permeate stream may comprise a third product stream.

In some cases, the feed stream may comprise a first set of proteins. The first set of proteins may comprise one or more higher molecular weight proteins. These higher molecular weight proteins may comprise glutens. In some cases, the first set of proteins may have an average molecular weight of about 2 kilodalton (kDa) to about 3,000 kDa. In some cases, the first set of proteins may have an average molecular weight of about 2 kDa to about 10 kDa, about 2 kDa to about 50 kDa, about 2 kDa to about 75 kDa, about 2 kDa to about 100 kDa, about 2 kDa to about 150 kDa, about 2 kDa to about 200 kDa, about 2 kDa to about 500 kDa, about 2 kDa to about 1,000 kDa, about 2 kDa to about 3,000 kDa, about 10 kDa to about 50 kDa, about kDa to about 75 kDa, about 10 kDa to about 100 kDa, about 10 kDa to about 150 kDa, about kDa to about 200 kDa, about 10 kDa to about 500 kDa, about 10 kDa to about 1,000 kDa, about 10 kDa to about 3,000 kDa, about 50 kDa to about 75 kDa, about 50 kDa to about 100 kDa, about 50 kDa to about 150 kDa, about 50 kDa to about 200 kDa, about 50 kDa to about 500 kDa, about 50 kDa to about 1,000 kDa, about 50 kDa to about 3,000 kDa, about 75 kDa to about 100 kDa, about 75 kDa to about 150 kDa, about 75 kDa to about 200 kDa, about 75 kDa to about 500 kDa, about 75 kDa to about 1,000 kDa, about 75 kDa to about 3,000 kDa, about 100 kDa to about 150 kDa, about 100 kDa to about 200 kDa, about 100 kDa to about 500 kDa, about 100 kDa to about 1,000 kDa, about 100 kDa to about 3,000 kDa, about 150 kDa to about 200 kDa, about 150 kDa to about 500 kDa, about 150 kDa to about 1,000 kDa, about 150 kDa to about 3,000 kDa, about 200 kDa to about 500 kDa, about 200 kDa to about 1,000 kDa, about 200 kDa to about 3,000 kDa, about 500 kDa to about 1,000 kDa, about 500 kDa to about 3,000 kDa, or about 1,000 kDa to about 3,000 kDa. In some cases, the first set of proteins may have an average molecular weight of about 2 kDa, about 10 kDa, about 50 kDa, about 75 kDa, about 100 kDa, about 150 kDa, about 200 kDa, about 500 kDa, about 1,000 kDa, or about 3,000 kDa.

In some cases, the first set of proteins may have an average molecular weight of at least about 2 kDa, about 10 kDa, about 25 kDa, about 50 kDa, about 55 kDa, about 60 kDa, about 65 kDa, about 70 kDa, about 75 kDa, about 80 kDa, about 85 kDa, about 90 kDa, about 95 kDa, about 100 kDa, about 150 kDa, about 200 kDa, about 500 kDa, or about 1,000 kDa. In some cases, the first set of proteins may have an average molecular weight of at most about 10 kDa, about 25 kDa, about 50 kDa, about 55 kDa, about 60 kDa, about 65 kDa, about 70 kDa, about 75 kDa, about 80 kDa, about 85 kDa, about 90 kDa, about 95 kDa, about 100 kDa, about 150 kDa, about 200 kDa, about 500 kDa, about 1,000 kDa, or about 3,000 kDa.

In some cases, the first set of proteins may have an average particle size of about 0.001 micrometers (μm) to about 100 μm. The first set of proteins may have an average particle size of about 0.001 μm to about 0.005 μm, about 0.001 μm to about 0.01 μm, about 0.001 μm to about μm, about 0.001 μm to about 0.05 μm, about 0.001 μm to about 0.1 μm, about 0.001 μm to about 0.5 μm, about 0.001 μm to about 1 μm, about 0.001 μm to about 5 μm, about 0.001 μm to about 10 μm, about 0.001 μm to about 100 μm, about 0.005 μm to about 0.01 μm, about 0.005 μm to about 0.02 μm, about 0.005 μm to about 0.05 μm, about 0.005 μm to about 0.1 μm, about 0.005 μm to about 0.5 μm, about 0.005 μm to about 1 μm, about 0.005 μm to about 5 μm, about μm to about 10 μm, about 0.005 μm to about 100 μm, about 0.01 μm to about 0.02 μm, about 0.01 μm to about 0.05 μm, about 0.01 μm to about 0.1 μm, about 0.01 μm to about 0.5 μm, about 0.01 μm to about 1 μm, about 0.01 μm to about 5 μm, about 0.01 μm to about 10 μm, about 0.01 μm to about 100 μm, about 0.02 μm to about 0.05 μm, about 0.02 μm to about 0.1 μm, about 0.02 μm to about 0.5 μm, about 0.02 μm to about 1 μm, about 0.02 μm to about 5 μm, about 0.02 μm to about 10 μm, about 0.02 μm to about 100 μm, about 0.05 μm to about 0.1 μm, about 0.05 μm to about 0.5 μm, about 0.05 μm to about 1 μm, about 0.05 μm to about 5 μm, about 0.05 μm to about 10 μm, about 0.05 μm to about 100 μm, about 0.1 μm to about 0.5 μm, about 0.1 μm to about 1 μm, about 0.1 μm to about 5 μm, about 0.1 μm to about 10 μm, about 0.1 μm to about 100 μm, about 0.5 μm to about 1 μm, about 0.5 μm to about 5 μm, about μm to about 10 μm, about 0.5 μm to about 100 μm, about 1 μm to about 5 μm, about 1 μm to about 10 μm, about 1 μm to about 100 μm, about 5 μm to about 10 μm, about 5 μm to about 100 μm, or about 10 μm to about 100 μm. The first set of proteins may have an average particle size of about 0.001 μm, about 0.005 μm, about 0.01 µm, about 0.02 µm, about 0.05 µm, about µm, about 0.5 µm, about 1 µm, about 5 µm, about 10 µm, or about 100 µm. The first set of proteins may have an average particle size of at least about 0.001 µm, about 0.005 µm, about µm, about 0.02 µm, about 0.05 µm, about 0.1 µm, about 0.5 µm, about 1 µm, about 5 µm, or about 10 µm. The first set of proteins may have an average particle size of at most about 0.005 µm, about 0.01 µm, about 0.02 µm, about 0.05 µm, about 0.1 µm, about 0.5 µm, about 1 µm, about 5 µm, about 10 µm, or about 100 µm.

In some cases, the first feed stream may comprise a second set of proteins. The second set of proteins may comprise gluten and/or prolamin. The second set of proteins may have an average molecular weight less than the average molecular weight of the first set of proteins. In some cases, the second set of proteins may have an average molecular weight of about 2 kilodalton (kDa) to about 500 kDa. In some cases, the second set of proteins may have an average molecular weight of about 2 kDa to about 5 kDa, about 2 kDa to about 10 kDa, about 2 kDa to about 25 kDa, about 2 kDa to about 50 kDa, about 2 kDa to about 75 kDa, about 2 kDa to about 100 kDa, about 2 kDa to about 150 kDa, about 2 kDa to about 200 kDa, about 2 kDa to about 500 kDa, about 5 kDa to about 10 kDa, about 5 kDa to about 25 kDa, about 5 kDa to about kDa, about 5 kDa to about 75 kDa, about 5 kDa to about 100 kDa, about 5 kDa to about 150 kDa, about 5 kDa to about 200 kDa, about 5 kDa to about 500 kDa, about 10 kDa to about 25 kDa, about 10 kDa to about 50 kDa, about 10 kDa to about 75 kDa, about 10 kDa to about 100 kDa, about 10 kDa to about 150 kDa, about 10 kDa to about 200 kDa, about 10 kDa to about 500 kDa, about 25 kDa to about 50 kDa, about 25 kDa to about 75 kDa, about 25 kDa to about 100 kDa, about 25 kDa to about 150 kDa, about 25 kDa to about 200 kDa, about 25 kDa to about 500 kDa, about 50 kDa to about 75 kDa, about 50 kDa to about 100 kDa, about 50 kDa to about 150 kDa, about 50 kDa to about 200 kDa, about 50 kDa to about 500 kDa, about 75 kDa to about 100 kDa, about 75 kDa to about 150 kDa, about 75 kDa to about 200 kDa, about 75 kDa to about 500 kDa, about 100 kDa to about 150 kDa, about 100 kDa to about 200 kDa, about 100 kDa to about 500 kDa, about 150 kDa to about 200 kDa, about 150 kDa to about 500 kDa, or about 200 kDa to about 500 kDa. In some cases, the second set of proteins may have an average molecular weight of about 2 kDa, about 5 kDa, about 10 kDa, about 25 kDa, about 50 kDa, about 75 kDa, about 100 kDa, about 150 kDa, about 200 kDa, or about 500 kDa. In some cases, the second set of proteins may have an average molecular weight of at least about 2 kDa, about 5 kDa, about 10 kDa, about 25 kDa, about 50 kDa, about 55 kDa, about 60 kDa, about 65 kDa, about 70 kDa, about 75 kDa, about 80 kDa, about 85 kDa, about 90 kDa, about 95 kDa, about 100 kDa, about 150 kDa, or about 200 kDa. In some cases, the second set of proteins may have an average molecular weight of at most about 5 kDa, about 10 kDa, about 25 kDa, about 50 kDa, about 55 kDa, about 60 kDa, about 65 kDa, about 70 kDa, about 75 kDa, about 80 kDa, about 85 kDa, about 90 kDa, about 95 kDa, about 100 kDa, about 150 kDa, about 200 kDa, or about 500 kDa.

The present disclosure provides molecular weights as a measurement of size. The molecular weight may be calculated or measured through one or more methods. The molecular weight of a polymer may be determined by various methods such as light scattering, viscometry, SEC etc. In the present disclosure, the molecular weight measurements herein may be determined by column elution spectrophotometry. Alternatively, the molecular weight measurements herein may be determined by light scattering.

In some cases, the second set of proteins may have an average particle size of about 1 nanometer (nm) to about 1,000 nm. In some cases, the second set of proteins may have an average particle size of about 1 nm to about 5 nm, about 1 nm to about 10 nm, about 1 nm to about 20 nm, about 1 nm to about 50 nm, about 1 nm to about 100 nm, about 1 nm to about 200 nm, about 1 nm to about 500 nm, about 1 nm to about 1,000 nm, about 5 nm to about 10 nm, about 5 nm to about 20 nm, about 5 nm to about 50 nm, about 5 nm to about 100 nm, about 5 nm to about 200 nm, about 5 nm to about 500 nm, about 5 nm to about 1,000 nm, about 10 nm to about 20 nm, about 10 nm to about 50 nm, about 10 nm to about 100 nm, about 10 nm to about 200 nm, about 10 nm to about 500 nm, about 10 nm to about 1,000 nm, about 20 nm to about 50 nm, about 20 nm to about 100 nm, about 20 nm to about 200 nm, about 20 nm to about 500 nm, about 20 nm to about 1,000 nm, about 50 nm to about 100 nm, about 50 nm to about 200 nm, about 50 nm to about 500 nm, about 50 nm to about 1,000 nm, about 100 nm to about 200 nm, about 100 nm to about 500 nm, about 100 nm to about 1,000 nm, about 200 nm to about 500 nm, about 200 nm to about 1,000 nm, or about 500 nm to about 1,000 nm. In some cases, the second set of proteins may have an average particle size of about 1 nm, about 5 nm, about 10 nm, about nm, about 50 nm, about 100 nm, about 200 nm, about 500 nm, or about 1,000 nm. In some cases, the second set of proteins may have an average particle size of at least about 1 nm, about 5 nm, about 10 nm, about 20 nm, about 50 nm, about 100 nm, about 200 nm, or about 500 nm. In some cases, the second set of proteins may have an average particle size of at most about 5 nm, about 10 nm, about 20 nm, about 50 nm, about 100 nm, about 200 nm, about 500 nm, or about 1,000 nm.

The process of the present disclosure may be applicable to wet mill processes for a broad range of grains, including corn, wheat, barley, rye, sorghum and oats. The prolamins in these grains are zein in corn, gliadin in wheat, hordein in barley, secalin in rye, kafirin in sorghum and avenin in oats. In some aspects, the protein recovery process of the present disclosure may maximize recovery and facilitate selective separation of valuable and previously lost protein species, including prolamins.

In some cases, the second set of proteins (e.g., one or more lower molecular weight proteins) may comprise glutens and/or prolamins. The glutens may be low molecular weight glutens. The glutens may have an average molecular weight of less than or equal to about 200 kDa, 150 kDa, 100 kDa, 90 kDa, 80 kDa, 70 kDa, 60 kDa, 50 kDa, 40 kDa, 30 kDa, or lower.

In some cases, one or more of the first retentate stream, second retentate stream, first permeate stream, and second retentate stream may be one or more recovery stream(s) of low molecular weight proteins. These one or more recovery stream(s) may comprise greater than 5%, 10%, 15%, 20%, 25%, 30%, 35%, 40%, 45%, 50%, 55%, 60%, 65%, 70%, 75%, 80%, 85%, 90%, 95%, 99%, or greater of the low molecular weight proteins in the feed stream.

In some cases, the second permeate stream can comprise both precipitated prolamin proteins and prolamin proteins that remain somewhat soluble. In some case, the second set of proteins may comprise soluble prolamin proteins prior to the second separation process (e.g. in the feed or first permeate stream) and precipitated prolamin proteins after the second separation process (e.g., in the second permeate stream). In some cases, the process of the present disclosure further comprises spray drying the entire permeate stream, comprising prolamin proteins. In some cases, spray drying the entire permeate stream may allow for recovery of a more pure prolamin product than without spray drying. In other cases, the process of the present disclosure may further comprise recovering precipitated prolamin proteins using standard separation methods. Such methods may include drying, decanting, filtration, centrifugation, or an additional membrane filtration step. The initial prolamin product may be further purified to prepare a pure prolamin final product, for example by a chromatographic approach or by simple recrystallization of the prolamin.

The feed from the wet mill grain process may be any stream comprising significant levels of proteins. In some cases, the major grain products (germ, starch, gluten meal) may have been removed. The feed may be an overflow stream from a thickener, decanter or centrifuge. The stream may be the filtrate from filter apparatus, e.g. a rotary vacuum filter. As a non-limiting example, the feed stream may contain less than 5 wt % total solids and less than 2 wt % suspended solids. In another example, the feed stream may contain less than 5 wt %, and most preferably less than 4 wt % total solids.

The process of the present disclosure may handle up to 100% of the overflow stream. In some cases, only a portion of the overflow stream is sent to the protein recovery process.

The present disclosure provides for at least a first and second membrane. The first and second membranes may comprise one or more membrane elements. An example of a membrane element may include a spiral wound membrane. The advantages of spiral wound membranes may include: significantly higher cross-sectional surface area, continuous processing, flexible and adaptable design based on both morphology and chemistry of substances rejected, wide pH operating range, temperature stability and capability of being formulated with specific surface properties.

The material selected for the membrane element is very important. The one or more membrane elements may comprise FDA approved components. The membrane elements may have contribute particular advantages to the processes or methods of the present disclosure on the basis of the membrane elements' pore size, chemical properties, processability, and membrane durability to process conditions and fouling rate. The membrane elements may include spacers. The spacers may allow the one or more of the separation processes of the present disclosure to better accommodate solids. In some cases, the membrane elements may comprise 10 mils to 270 mils spacer elements. The membrane elements may comprise 30 mils to 135 mils spacer elements. The size of the spacer elements may be tailored to the morphology of the solids being separated. The spacer elements of the membranes may improve the ability of the membranes to accommodate pasty and non-amorphous solids. The spacer elements may further retain the surface area advantage of the membrane (e.g., such as a spiral wound membrane), versus a membrane that does not comprise spacer elements (e.g., hollow fiber or tubular membrane).

In an aspect, the protein recovery process may comprise at least two membrane steps. In some cases, a first step of the at least two-step membrane protein recovery process may involve the use of first membrane (e.g., a microporous membrane). The first membrane may be an ultrafiltration membrane. The first membrane may be a spiral wound membrane. The first membrane may be a microporous polymer membrane. The first membrane may have an average pore size between about 1 nanometer (nm) and about 500 nm. The first membrane may have an average pore size of about 3 nm to about 500 nm. The first membrane may have an average pore size of about 1 nm to about 5 nm, about 3 nm to about 10 nm, about 3 nm to about 20 nm, about 3 nm to about 50 nm, about 3 nm to about 100 nm, about 3 nm to about 250 nm, about 3 nm to about 500 nm, about 5 nm to about 10 nm, about 5 nm to about 20 nm, about 5 nm to about 50 nm, about 5 nm to about 100 nm, about 5 nm to about 250 nm, about 5 nm to about 500 nm, about 10 nm to about 20 nm, about 10 nm to about 50 nm, about 10 nm to about 100 nm, about 10 nm to about 250 nm, about 10 nm to about 500 nm, about 20 nm to about 50 nm, about 20 nm to about 100 nm, about 20 nm to about 250 nm, about 20 nm to about 500 nm, about 50 nm to about 100 nm, about 50 nm to about 250 nm, about 50 nm to about 500 nm, about 100 nm to about 250 nm, about 100 nm to about 500 nm, or about 250 nm to about 500 nm. The first membrane may have an average pore size of about 3 nm, about 5 nm, about 10 nm, about 20 nm, about 50 nm, about 100 nm, about 250 nm, or about 500 nm. The first membrane may have an average pore size of at least about 3 nm, about 5 nm, about 10 nm, about 20 nm, about 50 nm, about 100 nm, or about 250 nm. The first membrane may have an average pore size of at most about 5 nm, about 10 nm, about 20 nm, about 50 nm, about 100 nm, about 250 nm, or about 500 nm. As an example, the first membrane may have an average pore size between about 20 nm to 100 nm.

In some cases, the first membrane may have a molecular weight cut off for the species it fractionates into the first retentate stream and the first permeate stream. The first membrane may have a molecular weight cutoff greater than or equal to about 5 kilodalton (kDa), 10 kDa, 12 kDa, 15 kDa, 20 kDa, 25 kDa, 30 kDa, 50 kDa, 75 kDa, 100 kDa, 150 kDa, 200 kDa, 250 kDa, 300 kDa, 400 kDa, 500 kDa, 700 kDa, 1,000 kDa, 2,000 kDa, 3,000 kDa, 4,000 kDa, kDa, 7,000 kDa, 10,000 kDa, 20,000 kDa, 50,000 kDa, 10,0000 kDa, or greater. The first membrane may have a molecular weight cutoff less than or equal to about 100,000 kDa, kDa, 20,000 kDa, 10,000 kDa, 8,000 kDa, 6,000 kDa, 5,000 kDa, 4,000 kDa, 2,000 kDa, 1,000 kDa, 800 kDa, 600 kDa, 400 kDa, 300 kDa, 200 kDa, 150 kDa, 100 kDa, 80 kDa, 50 kDa, kDa, 20 kDa, 15 kDa, 13 kDa, 10 kDa, 6 kDa, or lower. The second membrane may have a molecular weight cut off between any two values described above, such as between about 10 kDa and about 10,000 kDa. In some cases, the first membrane may comprise a microporous structure produced from a polymer, such as polysulfone, polyvinyl difluoride, polyethersulfone, polyacrylonitrile, polyetherimide, or other membrane-forming polymers or polymer blends. The first membrane may include a non-woven polymer backing to enhance the mechanical strength and durability of the microporous membrane.

The first step of the at least two step process, may provide a first retentate stream. In some cases, the first retentate stream may comprise a first set of proteins (e.g., higher molecular weight glutens) and/or particulates. In some cases, the first step may generate a first permeate stream. The first permeate stream may comprise second set of proteins (e.g., lower molecular weight glutens and prolamins). The first retentate stream may comprise a first product stream. The first retentate stream (e.g., first product stream) may be directed to a separation device to facilitate recovery of a first protein product. Alternatively, the first retentate may be returned to the wet mill grain process. In some cases, the wet mill grain process is integrated with the process of the present disclosure. The first retentate stream may be returned to the feed side of one or more units of the wet mill grain process (e.g., a thickener, decanter, centrifuge, or filter). In some cases the first retentate stream may be directed to one or more units to separate out major grain products. In some cases, the first retentate stream is returned to the input of a separation device. The separation device may provide the feed to the membrane recovery process, e.g. the MST Thickener. The permeate stream from the first membrane may be sent to second membrane process of the at least two-step membrane recovery process.

In the first step, the first membrane may reject greater than about 20%, 30%, 40%, 45%, 50%, 55%, 60%, 65%, 70%, 75%, 80%, 85%, 90%, 95%, 99% or more of the insoluble particulates. The insoluble particles may be greater than 0.5 micrometers in diameter. In some cases, the insoluble particles may have a particle size between about 0.1 micrometer and about 5 micrometers. The first membrane may reject high molecular weight solubles in the range of 5% to 70%. The first membrane may reject high molecular weight solubles at a rate greater than 40%, 45%, 50%, 55%, 60%, 65%, 70%, 75%, 80%, 85%, 90%, 95%, 99% or more, depending on the average pore size of the first membrane. The first and/or second membrane may be designed to provide a pressure-normalized flux. The pressure-normalized flux may ensure operability and aid the process in achieving economic targets. The membranes may be designed to provide long-term stability and durability to cleaning-in-place cycles. The membranes may be designed to remove as much of the insoluble particulates as possible, such as greater than 40%, 45%, 50%, 55%, 60%, 65%, 70%, 75%, 80%, 85%, 90%, 95%, 99% or more, (e.g., up to 100%) to reduce the fouling rate of the second membrane (e.g., a nanofiltration membrane) used in the second step.

The second step of the at least two-step membrane protein recovery process may comprise a second membrane. The second membrane may comprise one or more spiral wound nanofiltration membrane. The second membrane may be the same as the first membrane. The second membrane may be an ultrafiltration membrane. The second membrane may have an average pore size less than or equal to the average pore size of the first membrane. The second membrane may have an average pore size of about 1 nanometer (nm) to about 300 nm. The second membrane may have an average pore size of about 1 nm to about 2 nm, about 1 nm to about 3 nm, about 1 nm to about 5 nm, about 1 nm to about 10 nm, about 1 nm to about 20 nm, about 1 nm to about 50 nm, about 1 nm to about 100 nm, about 1 nm to about 300 nm, about 2 nm to about 3 nm, about 2 nm to about 5 nm, about 2 nm to about 10 nm, about 2 nm to about 20 nm, about 2 nm to about 50 nm, about 2 nm to about 100 nm, about 2 nm to about 300 nm, about 3 nm to about 5 nm, about 3 nm to about 10 nm, about 3 nm to about 20 nm, about 3 nm to about nm, about 3 nm to about 100 nm, about 3 nm to about 300 nm, about 5 nm to about 10 nm, about 5 nm to about 20 nm, about 5 nm to about 50 nm, about 5 nm to about 100 nm, about 5 nm to about 300 nm, about 10 nm to about 20 nm, about 10 nm to about 50 nm, about 10 nm to about 100 nm, about 10 nm to about 300 nm, about 20 nm to about 50 nm, about 20 nm to about 100 nm, about 20 nm to about 300 nm, about 50 nm to about 100 nm, about 50 nm to about 300 nm, or about 100 nm to about 300 nm. The second membrane may have an average pore size of about 1 nm, about 2 nm, about 3 nm, about 5 nm, about 10 nm, about 20 nm, about 50 nm, about 100 nm, or about 300 nm. The second membrane may have an average pore size of at least about 1 nm, about 2 nm, about 3 nm, about 5 nm, about 10 nm, about 20 nm, about 50 nm, or about 100 nm. The second membrane may have an average pore size of at most about 2 nm, about 3 nm, about 5 nm, about 10 nm, about 20 nm, about 50 nm, about 100 nm, or about 300 nm. In some cases, the second membrane may have a pore size less than about 50 nm, 45 nm, 40 nm, 35 nm, 30 nm, 25 nm, 20 nm, 18 nm, 16 nm, 14 nm, 12 nm, 10 nm, 9 nm, 8 nm, 7 nm, 6 nm, 5 nm, 4 nm, 3 nm, 2 nm, 1 nm or lower.

In some cases, the second membrane may have a molecular weight cut off for the species it fractionates into the second retentate stream and the second permeate stream. The second membrane may have a molecular weight cutoff greater than or equal to about 2 kDa, 3 kDa, 4 kDa, 5 kDa, 6 kDa, 7 kDa, 8 kDa, 9 kDa, 10 kDa, 12 kDa, 15 kDa, 20 kDa, 25 kDa, 30 kDa, 50 kDa, 75 kDa, 100 kDa, 150 kDa, 200 kDa, 250 kDa, 300 kDa, 400 kDa, 500 kDa, 700 kDa, 1,000 kDa, 2,000 kDa, 3,000 kDa, 4,000 kDa, 5,000 kDa, 7,000 kDa, 10,000 kDa, kDa, 50,000 kDa, 10,0000 kDa, or greater. The second membrane may have a molecule weight cutoff less than or equal to about 100,000 kDa, 50,000 kDa, 20,000 kDa, 10,000 kDa, 8,000 kDa, 6,000 kDa, 5,000 kDa, 4,000 kDa, 2,000 kDa, 1,000 kDa, 800 kDa, 600 kDa, 400 kDa, 300 kDa, 200 kDa, 150 kDa, 100 kDa, 80 kDa, 50 kDa, 30 kDa, 20 kDa, 15 kDa, 13 kDa, kDa, 8 kDa, 6 kDa, 5 kDa, 4 kDa, 3 kDa, or lower. The second membrane may have a molecular weight cut off between any two values described above, such as between about 10 kDa and about 10,000 kDa. Commercially available nanofiltration polymer membranes may include thin film composite membranes. Such thin film composite membranes may comprise a microporous polymer membrane substrate with pore sizes in the range of 0.05 to 0.2 microns, and a top nanoporous polymer layer of pore size less than 20 nm, or molecular weight cut-off (MWCO) less than 5 kDa. The microporous polymer membrane used as a substrate may be produced from a variety of polymers, such as polysulfone, polyvinyl difluoride, polyethersulfone, polyacrylonitrile, polyetherimide, as well as from other membrane-forming polymers and polymer blends. The top nanoporous polymer layer may be formed by a dip-coating or interfacial polymerization process. The top nanoporous polymer layer may contribute the separation properties of the nanoporous membrane as it selectively rejects ions and soluble compounds based on size and charge. The nanofiltration membrane may also be produced directly using a phase inversion process similar to the process used to produce microporous membranes.

The second separation process (e.g., second membrane) may be designed to provide a second retentate stream comprising a second set of proteins (e.g., lower molecular weight glutens) and a second permeate stream. In some cases, the second permeate stream may comprise comprising greater than 20%, 25%, 30%, 35%, 40%, 45%, 50%, 55%, 60%, 65%, 70%, 75%, 80%, 85%, 90%, 95%, 99% or more the prolamins from the feed stream. In some cases, the second permeate stream may comprise greater than 20%, 25%, 30%, 35%, 40%, 45%, 50%, 55%, 60%, 65%, 70%, 75%, 80%, 85%, 90%, 95%, 99% or greater of the second set of proteins (e.g., other lower molecular weight proteins). In some cases, the second permeate stream may comprise at least a portion of non-protein solubles from the feed stream. As discussed above, the removal of the first and/or second set of proteins that comprises glutens may allow a portion of the prolamins in the second permeate stream to precipitate, facilitating their recovery. In some cases, the second retentate stream (e.g. from a nanofiltration membrane) comprising lower molecular weight proteins, may be sent to a separation device to facilitate recovery of a protein product. Alternatively, the second retentate stream (e.g., from a nanofiltration membrane) may be returned to wet mill grain process. The second retentate stream may be directed to the feed side of a thickener, decanter, centrifuge or filter of the wet mill grain process. The second retentate stream may be directed to a further separation device to separate the major grain products from the second retentate stream. Alternatively, the second retentate stream may be returned to the separation device upstream of the membrane recovery process, e.g. the MST Thickener. The second permeate stream may be sent to a separation device to recover prolamin. The second permeate stream may be spray dried to recover both precipitated prolamins and prolamins that remain somewhat soluble. Precipitated prolamins may be recovered using standard separation methods. Such methods may include centrifuging, decanting, filtering or an additional membrane process. The prolamin (e.g. impure prolamin) may be further purified by methods such as recrystallization or chromatographic separation. Thus, the present disclosure provides a method and process of obtaining a pure prolamin product. The exact method used to purify the prolamin may be specific to the prolamin form. The overflow from the separation device can be returned to the wet mill grain process.

In the second step, the second membrane (e.g., a nanofiltration membrane) may provide a second retentate stream comprising greater than 20%, 25%, 30%, 35%, 40%, 45%, 50%, 55%, 60%, 65%, 70%, 75%, 80%, 85%, 90%, 95%, 99% or more of the lower molecular weight solubles (e.g., lower molecular weight glutens). The membranes may be designed to provide a pressure-normalized flux to ensure operability and achieve economic targets. The membranes may be designed to provide long-term stability and durability to cleaning-in-place cycles.

The materials of the first membrane (e.g., microporous membrane) and second membrane (e.g., nanoporous membrane) may be the same or different.

The at least two-step membrane process may include an additional (e.g., third) step. The additional step may comprise fractionating the first retentate stream using a third membrane that provides a third retentate stream. This third retentate stream may comprise the highest molecular weight glutens. The third membrane may produce a third permeate stream comprising lower molecular weight glutens.

The process of the present disclosure may be integrated with a wet mill grain preprocess which separates high value agricultural and food products from a broad range of grains, including corn, wheat, barley, rye, sorghum and oats. The process of the present disclosure allows the fractionation and recovery of gluten and prolamin products that are currently lost in the preprocess. In addition, integration with a wet mill grain preprocess may provide additional improvements, including, but not limited to: (i) recovery of the gluten and prolamin products removes organics from the steep and increases upstream capacity; (ii) recovery of the gluten and prolamin products reduces the organic content of the stream sent to waste treatment.

Recovery of the gluten and prolamin products may remove organic compounds from the steep and increase upstream capacity of the wet mill grain process. Recovery of the gluten and prolamin products may remove non-fermantable organic compounds from the steep and increase upstream capacity of the wet mill grain process. Recovery of the gluten and prolamin products may reduce the quantity of organic content of the stream that may be sent to waste treatment.

As indicated above, streams from the at least two-step membrane protein recovery process may be directly returned to the wet mill grain pre-process. Alternatively, the streams may be returned to the wet mill grain pre-process after being subjected to a protein product separation step. Thus, the at least two-step membrane process may be fully integrated into the wet mill grain preprocess and may not, or need not, introduce any new chemicals or by-products into the preprocess. The process may further comprise cleaning one or more membranes in place, allowing additional load to waste treatment. The process may recover enough zein and reduce the costs of treating organic load in wastewater streams to offset the cost of recovery of zein.

Other benefits of the integrating the membrane recovery process into the wet mill grain process may include, but are not limited to: (i) allowing recovery of previously lost protein streams, thus increasing revenue; (ii) providing an option for production of a high purity and high value prolamin products that may expand the commercial applications of these biomaterials; (iii) improving process sustainability and reducing ultimate wastewater impact; (iv) reducing concentration of "non-fermentables" where overflow from the gluten thickener (e.g. MST) is reconstituted into the Steep, ultimately improving plant grind rate.

In some cases one or more of the product streams may be used to make at least one desirable article. The one or more product streams may be the first or second retentate stream, or the first or second permeate stream.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

FIG. 1 shows a schematic of a corn wet milling process showing the gluten protein separating step.

Figure 2:
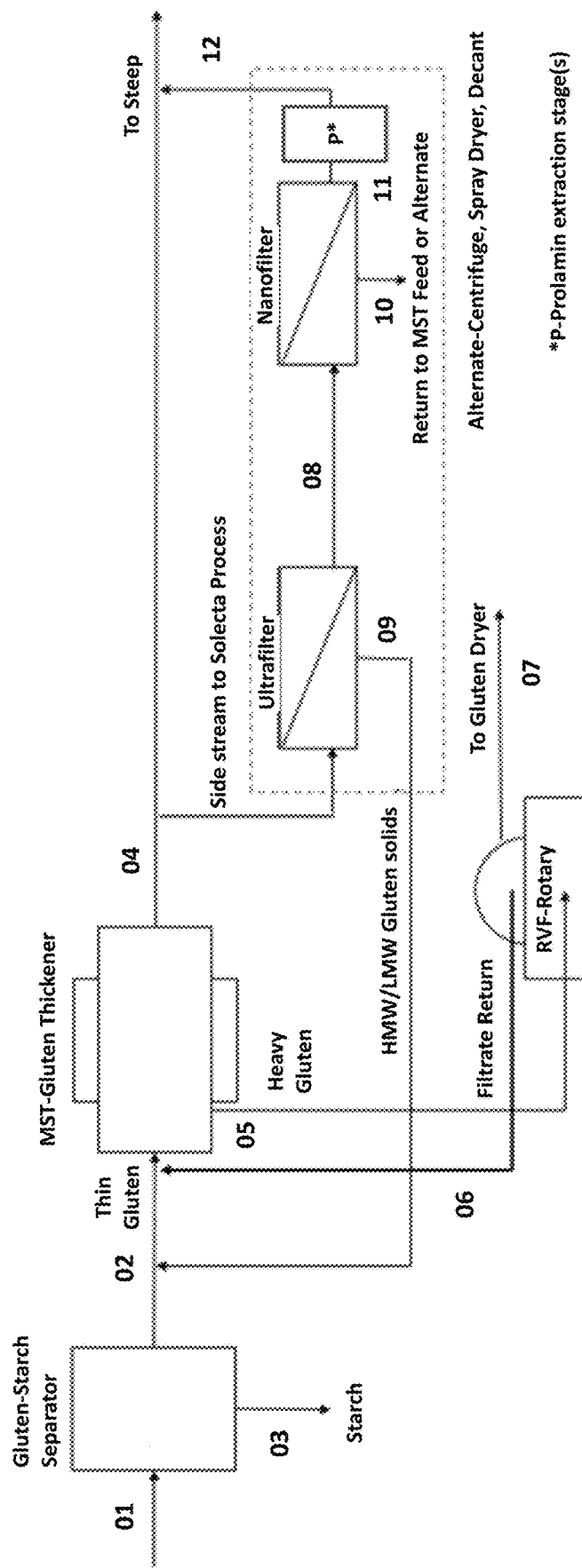
FIG. 2 is a schematic of an example two-step membrane protein recovery process integrated with a wet mill grain process.

FIG. 2 shows a schematic of a two-step membrane protein recovery process integrated with a wet mill grain process. In FIG. 2, the two-step membrane protein recovery process is integrated downstream of the MST Gluten Thickener. The feed stream 01, which is thin gluten slurry, is sent to a gluten thickener producing an overflow returning to preprocess (Steep), 04 and a heavy gluten stream 05 which is sent to a filter. The filter solids 07 are sent to the gluten dryer and the filtrate 06 returned to the feed side of the gluten thickener. In this disclosure, all or at least a portion of the gluten thickener overflow 04 is sent to the membrane ultrafiltration unit. The permeate from the ultrafiltration unit 08 is sent to a nanofiltration unit. The gluten solids retentate stream 09, comprising insolubles and higher molecular weight glutens, can either be returned to the feed of the gluten thickener or sent to a separation device to recover a protein product. The nanofiltration unit produces a retentate stream comprising lower molecular weight glutens 10 and a permeate stream comprising prolamins 11. The retentate stream 10 can either be returned to the feed side of the gluten thickener or sent to a separation device to recover a protein product. The permeate stream 11, comprising prolamins can be sent to a spray dryer or separation device to recover prolamin products or simply returned to the preprocess (Steep).

Figure 3:
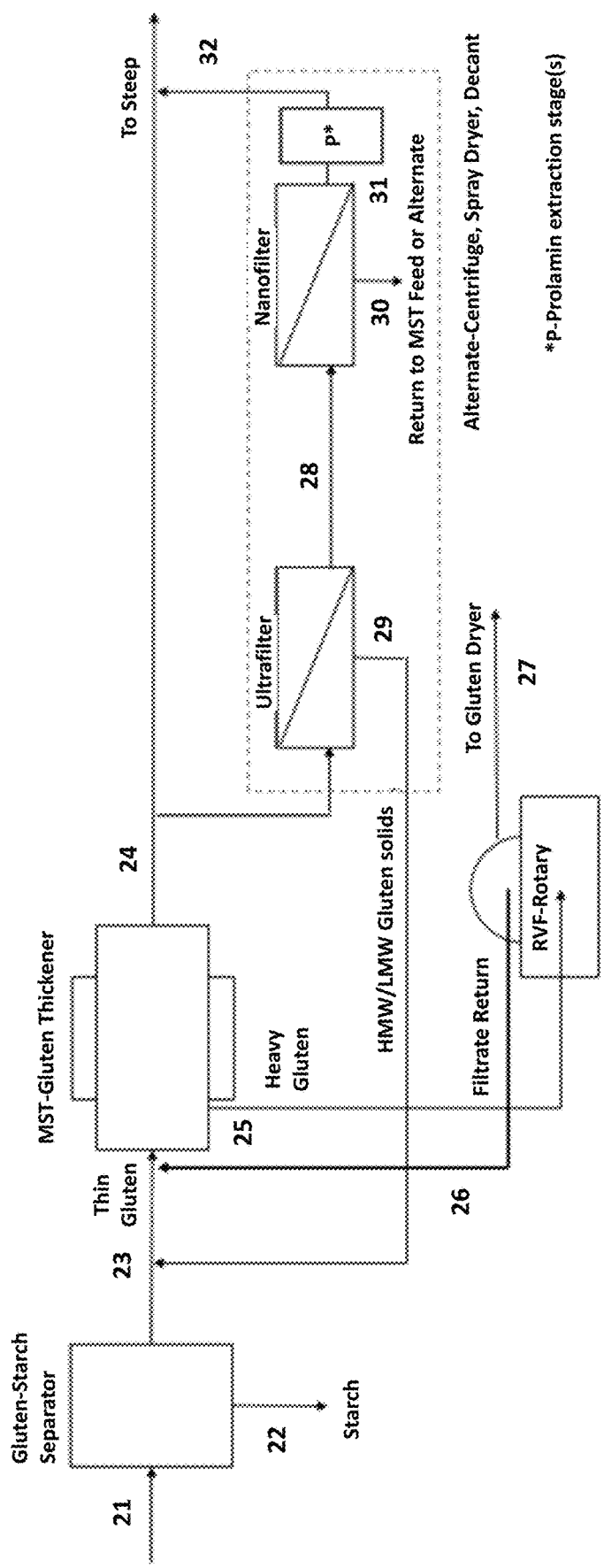
FIG. 3 is a schematic showing an example method by which a stream from mechanical separation device in a wet mill grain process is in fluid communication with a fluid channel of a two-stage membrane protein recovery process.

FIG. 3 shows a schematic of a two-step membrane protein recovery process integrated at a mechanical separation device, e.g., a rotary vacuum filter (RVF). The feed stream 21 is fed to a gluten thickener producing an overflow returning to preprocess (e.g. steep) 24 and a heavy gluten stream 25 which is sent to a filter. The filter solids 27 are sent to the gluten dryer and the filtrate 26 sent to the membrane ultrafiltration unit. The permeate from the ultrafiltration unit 28 is sent to a nanofiltration unit. The retentate from the ultrafiltration unit 29, comprising insolubles and higher molecular weight glutens, can either be returned to the feed of the gluten thickener or sent to a separation device to recover a protein product. The nanofiltration unit produces a retentate stream comprising lower molecular weight glutens 30 and a permeate stream comprising prolamins 31. The retentate stream 30 can either be returned to the feed side of the gluten thickener or sent to a separation device to recover a protein product. The permeate stream 31, comprising prolamins can be sent to a spray dryer or separation device to recover prolamin products or simply returned to the preprocess ((e.g., steep).

Figure 4:
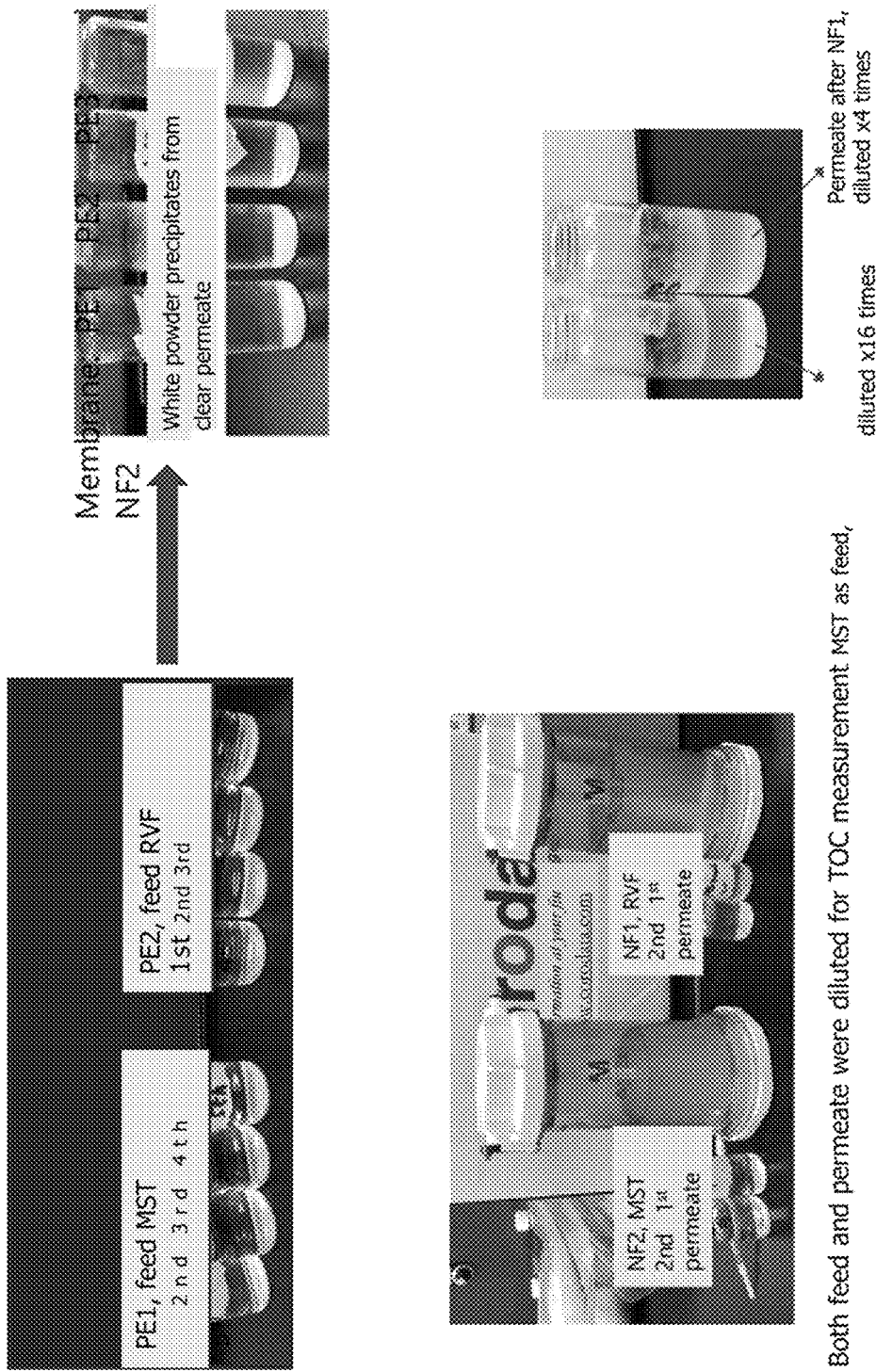
FIG. 4 shows the precipitated prolamin after nanofiltration and dilution.

FIG. 4 shows the precipitated prolamin after nanofiltration and dilution.

Figure 5:
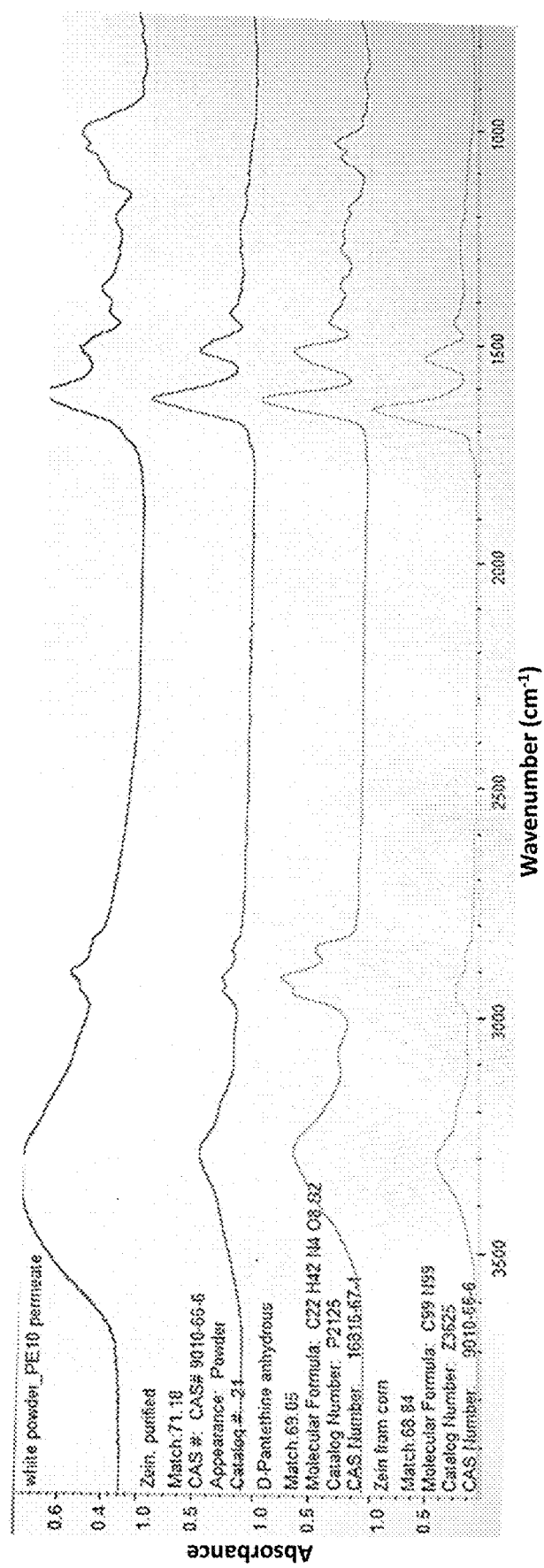
FIG. 5 shows the presence of prolamin within the precipitated white powder of FIG. 4.

FIG. 5 shows the presence of prolamin within the precipitated white powder of FIG. 4.

Figure 6:
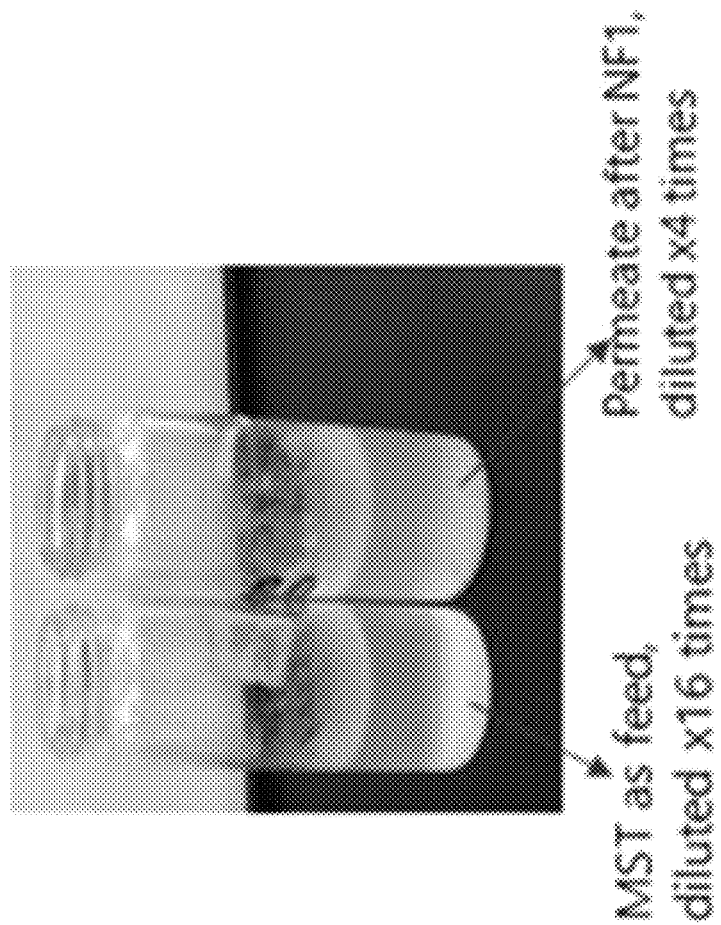
FIG. 6 shows the feed from the thickener, as a gluten source, compared to the permeate from subjecting the feed to a first nanofiltration membrane.

FIG. 6 shows the feed from the thickener, as a gluten source, compared to the permeate from subjecting the feed to a first nanofiltration membrane.

Thus, the present disclosure provides approaches for achieving a membrane fractionation of proteins from a wet mill grain process feed. The membrane fractionation method may produce three streams comprising valuable protein products: (i) a retentate stream from a microporous membrane, comprising higher molecular weight glutens; (ii) a retentate stream from a nanofiltration membrane, comprising lower molecular weight glutens; and (iii) a permeate stream from a nanofiltration membrane, comprising prolamin proteins.

In another aspect, the present disclosure provides a first process of recovering a stream comprising valuable glutens and prolamins, wherein the stream comprising valuable glutens and prolamins is provided by a wet mill grain preprocess that is integrated with the first process.

The disclosure further provides a protein recovery system that is integrated with at least one wet mill grain preprocess.

In some examples, the presence of gluten proteins and other non-protein species stabilized the zein proteins and kept them in solution or perhaps in some colloidal form. By removing the glutens and these other species using the fractionation approach, this stabilization was disrupted, resulting in precipitation of a portion of the zein proteins, thus allowing recovery of the otherwise difficult to recover zein proteins. Prolamins, like zein, generally have poor solubility in water. However, these examples show that the zein may be stabilized in solution by the presence of other organic compounds, both protein and non-protein species, whose removal results in precipitation of the prolamins, thus facilitating their recovery.

In one example, a method of recovering and fractionating valuable protein streams from wet mill grain processes comprises subjecting the overflow or filtrate of a mechanical separation device from a wet grain process to an ultrafiltration process utilizing a microporous membrane under conditions effective to provide an ultrafiltration retentate stream comprising higher molecular weight glutens and a permeate stream comprising colloidal and soluble proteins, comprising lower molecular weight glutens and prolamins; and subjecting the ultrafiltration permeate stream from the microporous membrane process to a nanofiltration process utilizing a nanofiltration membrane under conditions effective to provide a nanofiltration retentate stream comprising lower molecular weight glutens, and a nanofiltration permeate stream comprising prolamins, thus allowing the fractionation (e.g., separation) of higher molecule weight proteins, lower molecular weight proteins and prolamins.

In one example, a method of recovering fine particulate, colloidal and soluble protein species, comprising high and low molecular weight glutens and prolamins, from an aqueous feed from a wet mill grain process comprises: subjecting the feed from the wet grain process to a first separation process utilizing a microporous membrane under conditions effective to provide a retentate stream comprising higher molecular weight proteins and a permeate stream comprising lower molecular weight proteins; and subjecting the permeate stream passing through the first microporous membrane to a second separation process utilizing a second membrane under conditions effective to provide a retentate stream comprising lower molecular weight glutens and a permeate stream comprising prolamins.

In some examples the first separation process comprises utilizing an ultrafiltration membrane. The second separation process may comprise utilizing an ultrafiltration membrane or a nano filtration membrane. In some examples the method comprises a separation process utilizing at least one spiral wound membrane element or at least two spiral wound membrane elements in series or in parallel.

In some examples the lower molecular weight proteins comprise glutens or prolamins.

In another example, a process for recovery of valuable prolamin products from wet mill grain processes comprises subjecting the overflow or filtrate of a mechanical separation device from the wet grain process to an ultrafiltration membrane process utilizing an microporous membrane under conditions effective to provide a ultrafiltration retentate stream comprising higher molecular weight glutens, and a permeate stream comprising fine particulate, colloidal and soluble proteins, including lower molecular weight glutens and prolamins; and subjecting the permeate stream from the microporous membrane process to a nanofiltration process utilizing a nanofiltration membrane under conditions effective to provide a retentate stream comprising lower molecular weight glutens, thus allowing prolamins to be recovered either by direct recovery, such as spray drying, or for the precipitated prolamins by standard separation devices.

In another example, the protein recovery process is integrated with a wet mill grain preprocess and comprises providing a feed from the overflow of a mechanical separation device of the wet grain preprocess to the first process; separating a retentate stream from an microporous membrane process comprising higher molecular weight glutens and returning the retentate stream to the wet mill grain preprocess or recovering a stream containing higher molecular weight glutens using a separation device and returning the overflow or filtrate from the separation device to the wet grain preprocess; sending the permeate stream from the ultrafiltration to nanofiltration; separating a retentate stream from the nanofiltration comprising lower molecular weight glutens and returning the retentate stream to the wet mill grain preprocess or recovering a stream comprising low molecular weight glutens using a separation device and returning the overflow or filtrate from the separation device to the wet grain preprocess; providing a permeate stream comprising prolamins and recovering prolamin products either by direct recovery, such as spray drying, or for precipitated prolamins in the permeate stream recovering the prolamin products using standard separation devices; and returning the liquid stream from the prolamin separation to the wet grain preprocess.

In some examples, the protein recovery process comprises a first process integrated with a wet mill grain preprocess, the first process comprising; providing a wet mill grain preprocess providing a feed from the overflow of a mechanical separation device to the first process; separating a retentate stream comprising higher molecular weight glutens by membrane separation using a microporous membrane; either returning the retentate stream to the wet mill grain preprocess or recovering the higher molecular weight glutens using a separation device and returning a liquid stream from the separation device to the wet mill grain preprocess; sending the permeate stream to a second membrane separation process; separating a retentate stream comprising lower molecular weight glutens using the second membrane; either returning the retentate stream to the wet mill grain preprocess or recovering the high molecular weight glutens using a separation device and returning a liquid stream from the separation device to the wet mill grain preprocess; recovering a permeate stream comprising previously soluble prolamins; recovering the prolamin products using a separation device, such as spray dryer, decanter, centrifuge, filter or membrane element; and returning the liquid stream from the prolamin separation device to the wet mill grain preprocess.

In some examples the wet mill preprocess is a corn, wheat, barley, rye, sorghum or oat wet mill process. In some examples the overflow stream from the mechanical separation device in the wet mill grain preprocess can be the overflow from a thickener, decanter or centrifuge or the filtrate from filtration device, e.g. a rotary vacuum filter.

In some examples the total solids contained in the overhead stream from the wet mill grain preprocess contains less than 10 wt % solids, less than 5 wt % solids, less than 4 wt % solids, less than 3 wt % solids, less than 2 wt % solids, less than 1 wt % solids, less than 0.5 wt % solids, or less than 0.1 wt % solids.

In one example the stream from the wet mill grain preprocess is in fluid communication with a microporous membrane in the first process and the retentate stream from the ultrafiltration step of the first process is returned to the wet mill grain preprocess. The permeate stream from ultrafiltration step in the first process is in fluid communication with a nanofiltration membrane in the first process. The retentate stream from the nanofiltration membrane in the first process is in fluid communication with the wet mill grain preprocess. A protein product comprising higher molecular weight proteins is recovered from the ultrafiltration retentate and a liquid stream returned to the wet mill grain process. A protein product comprising lower molecular weight proteins is recovered from the nanofiltration retentate and a liquid stream returned to the wet mill grain process. Proteins comprising prolamins in the permeate stream from the nanofiltration membrane are recovered and the liquid stream is returned to the wet mill grain preprocess. Recovery of a stream comprising prolamins is increased by removal of a stream comprising other low molecular weight proteins, comprising glutens. The recovered protein species comprise glutelins, prolamins and glutens. Recovered non-protein species comprise carbohydrates, starches, enzymes, alcohols, aldehydes, fats or other low molecular weight organic species. The streams comprising solid protein species are recovered by centrifugation, spray-drying, decanting, filtration or an additional membrane step. The recovered prolamin can be further purified to provide high purity prolamin products. In some cases the recovered prolamin may be further purified to provide a high purity prolamin product with an average molecular weight of greater than about 5 kDa, 10 kDa, 15 kDa, 20 kDa, 25 kDa, 30 kDa, 35 kDa, 40 kDa, 45 kDa, 50 kDa, 55 kDa, 60 kDa, 65 kDa, 70 kDa, 75 kDa, 80 kDa, 90 kDa, 100 kDa, 120 kDa, 150 kDa, or greater.

In some examples the microporous membrane is a low fouling spiral wound membrane comprising at least one material comprising polysulfone, polyvinyl difluoride, polyethersulfone, polyacrylonitrile, or polyetherimide. The nominal pore size range for the microporous membrane is equal to or between 0.01 microns and 0.75 microns. In other examples, the nominal pore size may be equal to or between 0.02 microns and 0.50 microns, equal to or between 0.05 microns to 0.20 microns, or equal to or between 0.05 microns to 0.10 microns. The feed pressure to the ultrafiltration membranes of this example is equal to or between 15 microns and 60 psig. In other examples, the feed pressure may be equal to or between 15 microns and 30 psig, equal to or between 30 microns and 60 psig, or equal to or between 45 microns and 60 psig.

In some examples the ultrafiltration and nanofiltration elements comprises spacers with thicknesses equal to or between 30 mils and 270 mils, with thicknesses equal to or between 30 mils, 41 mils, 65 mils, 80 mils, 120 mils, 135 mils and 270 mils. In some examples the ultrafiltration element comprises spacers with thicknesses greater or equal to 30 mils, greater or equal to 45 mils, greater or equal to 60 mils, greater or equal to 75 mils, greater or equal to 90 mils, greater or equal to 105 mils, greater or equal to 120 mils, or greater or equal to 135 mils, or greater or equal to 270 mils. In some examples the ultrafiltration element comprises spacers with thicknesses less than or equal to 30 mils, less than or equal to 45 mils, less than or equal to 60 mils, less than or equal to 75 mils, less than or equal to 90 mils, less than or equal to 105 mils, less than or equal to 120 mils, or less than or equal to 135 mils, or greater than or equal to 270 mils.

In some examples at least 90% of the insoluble particulates, typically greater than 0.5 micron in diameter, remain in the retentate stream after the feed stream is subjected to the microporous membrane.

In some examples 50% to 70% of the high molecular weight solubles and fine particulates, typically greater than 0.5 microns, are in the retentate stream from the microporous membrane.

In some examples the nanofiltration membrane is a low fouling spiral wound membrane comprised of one polysulfone, polyvinyl difluoride, polyethersulfone, polyacrylonitrile, polyetherimide, and the preferred membrane materials comprise polysulfone and polyvinyl difluoride.

In some examples the nominal pore size of the nanofiltration polymer membrane is less than 20 nm, preferably less than 15 nm.

In some examples the nanofiltration polymer membrane is a thin film composite membrane.

In some examples the thin film composite nanofiltration membrane comprises a microporous membrane substrate with pore size in the range of 0.05 microns to 0.2 microns and comprises a top nanoporous polymer layer of pore size less than 20 nm or with a molecular weight cut-off less than 5000.

In some examples the thin film composite nanofiltration membrane comprises a top nanoporous polymer layer produced by a dip-coating or interfacial polymerization process.

In some examples the nanofiltration membrane is formed directly using a phase inversion process.

In some examples the nanofiltration membrane provides a retentate comprising at least 80% of the lower molecular weight solubles, comprising lower molecular weight glutens.

In some examples the feed pressure to the microporous and nanofiltration membrane elements ranges from 15 psig to 200 psig.

In some examples the materials selected for the microporous and nanofiltration membranes are the same or different.

In some examples the temperature of overflow stream from the preprocess and the membrane steps of the first process are in the range of 25° C. to 65° C.

In some examples the prolamin recovery is 1 to 99% of the prolamin contained in the stream to the first process membrane unit.

In some examples the first microporous membrane has a MWCO in the range of 2,000 to a range of 1,000 to 5,000, a range of 2,000 to 3,000, a range of 3,000 to 5,000, a range of 1,000 to 3,000, or a range of 2,000 to 4,000. In some examples the first microporous membrane has a MWCO less than 5,000, less than 4,000, less than 3,000, less than 2,000, or less than 1,000. In some examples the second microporous membrane has a MWCO in the range of 2,000 to a range of 1,000 to 5,000, a range of 2,000 to 3,000, a range of 3,000 to 5,000, a range of 1,000 to 3,000, or a range of 2,000 to 4,000. In some examples the second microporous membrane has a MWCO less than 5,000, less than 4,000, less than 3,000, less than 2,000, or less than 1,000.

In some examples the membrane protein recovery system is integrated with a wet mill grain system comprising: (a) at least one gluten starch separator; (b) at least one gluten thickener; (c) at least one grain steeping vessel; and (d) at least two spiral wound membranes.

In some examples, at least one of the two membranes is in fluid contact with at least one gluten thickener; and at least one of the membranes is in fluid contact with the at least one grain steeping vessel.

In some examples the membrane protein recovery system and wet mill grain system comprise at least one microporous membrane in fluid contact with the at least one gluten thickener.

In some examples the membrane protein recovery system and wet mill grain system comprise at least one nanofiltration membrane in fluid contact with the at least one grain steeping vessel.

In some examples the membrane protein recovery system and wet mill grain system comprise a retentate stream from the at least one microporous membrane in fluid contact with the at least one gluten thickener.

In some examples the membrane protein recovery system and wet mill grain system comprise a retentate stream from the at least on ultrafiltration membrane in fluid contact with a separation device.

In some examples the membrane protein recovery system and wet mill grain system comprise a liquid stream from a separation device used to treat the retentate from the at least one microporous membrane in fluid contact with the at least one gluten thickener.

In some examples the membrane protein recovery system and wet mill grain system comprise a permeate stream from the at least one microporous membrane in fluid contact with the at least one nanofiltration membrane.

In some examples the membrane protein recovery system and wet mill grain system comprise a retentate stream from the at least one nanofiltration membrane in fluid contact with the at least one gluten thickener.

In some examples the membrane protein recovery system and wet mill grain system comprise a retentate stream from the at least on nanofiltration membrane in fluid contact with a separation device.

In some examples the membrane protein recovery system and wet mill grain system comprise a liquid stream from a separation device used to treat the retentate from the at least one nanofiltration membrane in fluid contact with the at least one gluten thickener.

In some examples the membrane protein recovery system and wet mill grain system comprise a permeate stream from the at least one nanofiltration membrane in fluid contact with the at least one steeping vessel.

In some examples the membrane protein recovery system and wet mill grain system comprise a permeate stream from the at least one nanofiltration membrane in fluid contact with a separation device, comprising a centrifuge, filter, decanter or another membrane element.

In some examples the membrane protein recovery system and wet mill grain system comprise a separation device, comprising a centrifuge, filter, decanter or another membrane element, in fluid contact with the grain steeping vessel.

In some examples the membrane protein recovery system and wet mill grain system comprise a permeate stream from the at least one nanofiltration membrane in fluid contact with a spray-drying device.

In some examples the membrane protein recovery system and wet mill grain system comprise a spray-drying device in fluid contact with the grain steeping vessel.

Embodiments

Embodiment 1. A method of recovering fine particulate, or protein species from a feed from a wet mill grain process, said method comprising: (a) subjecting the feed from the wet mill grain process to a first separation process utilizing a first membrane under conditions effective to provide a first retentate stream comprising one or more higher molecular weight proteins having an average molecular weight of greater than 75 kilodalton and a first permeate stream comprising one or more lower molecular weight proteins having an average molecular weight of less than 75 kilodalton; and (b) subjecting the first permeate stream to a second separation process utilizing a second membrane under conditions effective to provide a second retentate stream comprising glutens and a second permeate stream comprising prolamins.

Embodiment 2. The method of Embodiment 1, wherein the first membrane comprises a microporous membrane.

Embodiment 3. The method of Embodiment 1 or 2, wherein the first membrane comprises an ultrafiltration membrane.

Embodiment 4. The method of any one of Embodiments 1-3, wherein the second membrane comprises a nanofiltration membrane.

Embodiment 5. The method of any one of Embodiments 1-4, wherein the one or more lower molecular weight proteins comprise glutens or prolamins.

Embodiment 6. The method of any one of Embodiments 1-5, wherein the one or more lower molecular weight proteins comprise glutens and prolamins.

Embodiment 7. The method of any one of Embodiment 1-6, further comprising an additional separation process utilizing at least one spiral wound membrane element.

Embodiment 8. The method of any one of Embodiments 1-7, further comprising an additional separation process utilizing at least two spiral wound membrane elements in series.

Embodiment 9. The method of Embodiment 8, wherein said at least two spiral wound membrane elements are in parallel.

Embodiment 10. The method of any one of Embodiments 1-9, wherein the one or more higher molecular weight proteins comprise glutens.

Embodiment 11. The method of any one of Embodiments 1-11, further comprising directing the second permeate stream to pass through a nanofiltration membrane unit to recover protein species comprising prolamins.

Embodiment 12. The method of Embodiment 11, wherein an ultrafiltration step precedes the nanofiltration step of said nanofiltration membrane unit.

Embodiment 13. The method of any one of Embodiments 1-12, wherein recovery of a stream comprising prolamins is increased by removal of a stream comprising glutens.

Embodiment 14. The method of any one of Embodiments 1-14, further comprising recovering one or more protein species or non-protein species from at least one of (i) the first retentate stream, (ii) the first permeate stream, (iii) the second retentate stream, and (iv) the second permeate stream.

Embodiment 15. The method of Embodiment 14, wherein the recovered protein species comprise glutelins, prolamins or glutens.

Embodiment 16. The method of Embodiment 14 or 15, wherein recovered non-protein species comprise carbohydrates, starches, enzymes, alcohols, aldehydes, fats or other low molecular weight organic species.

Embodiment 17. The method of any one of Embodiments 1-16, wherein a grain feed to the wet mill grain process comprises corn, wheat, barley, rye, oats, or rice.

Embodiment 18. The method of any one of Embodiments 1-17, wherein the feed from the wet mill grain process to the first separation process is supplied from an overflow of a mechanical separation device or gravity separation device.

Embodiment 19. The method of any one of Embodiments 1-18, wherein the feed from the wet mill grain process is an aqueous stream with no added organic solvent.

Embodiment 20. The method of any one of Embodiments 1-19, wherein the first membrane comprises a low fouling spiral wound membrane comprising at least one polysulfone, polyvinyl difluoride, polyethersulfone, polyacrylonitrile, or polyetherimide.

Embodiment 21. The method of Embodiment 20, wherein the first membrane material comprises polysulfone, polyvinyl difluoride, or polyethersulfone.

Embodiment 22. The method of any one of Embodiments 1-21, wherein the second membrane comprises a nanofiltration membrane which is a low fouling spiral wound membrane comprising at least one polysulfone, polyvinyl difluoride, polyethersulfone, polyacrylonitriles, or polyetherimide material as a microporous substrate and comprises a top interfacial coating or separation layer.

Embodiment 23. The method of any one of Embodiments 1-21, wherein the second membrane comprises a nanofiltration membrane material comprising a microporous polysulfone membrane as substrate and a top interfacial cross-linked polyamide layer.

Embodiment 24. The method of any one of Embodiments 7-9 and 20-22, wherein the spiral wound membrane elements include a spacer element with a thickness equal to or between mils and 270 mils thickness.

Embodiment 25. The method of any one of Embodiments 7-9, 20-22 and 24, wherein the spiral wound membrane elements include a spacer element with a thickness equal to or between mils and 135 mils.

Embodiment 26. The method of any one of Embodiments 1-25, wherein the first separation process or the second separation process is operated at a feed pressure of 15 psig to 200 psig.

Embodiment 27. The method of any one of Embodiments 1-26, wherein a nominal pore size of the first membrane is between about 0.02 microns and 0.50 microns.

Embodiment 28. The method of any one of Embodiments 1-26, wherein a nominal pore size of the first membrane is between about 0.05 microns and 0.20 microns.

Embodiment 29. The method of any one of Embodiments 1-28, wherein the first retentate stream comprises at least 90% of the insoluble particulates greater than 0.5 microns in diameter.

Embodiment 30. The method of any one of Embodiments 1-29, wherein a reject stream from the first membrane comprises 5% to 70% of high molecular weight solubles and fine particulates greater than 0.5 microns in size.

Embodiment 31. The method of any one of Embodiments 1-30, wherein the second membrane is a nanofiltration membrane.

Embodiment 32. The method of Embodiment 31, wherein a nominal pore size of the nanofiltration membrane is less than about 20 nanometers.

Embodiment 33. The method of Embodiment 31 or 32, wherein the nanofiltration membrane is a thin composite membrane.

Embodiment 34. The method of Embodiment 33, wherein the thin film composite nanofiltration membrane comprises a microporous membrane substrate with a pore size in between about 0.05 and 0.2 microns.

Embodiment 35. The method of Embodiment 33 or 34, wherein the thin film composite nanofiltration membrane comprises a top nanoporous polymer layer of pore size less than about nanometers, or with a molecular weight cut-off less than 5000.

Embodiment 36. The method of any one of Embodiments 33-35, wherein the thin film composite nanofiltration membrane comprises a top nanoporous polymer layer produced by a dip-coating or interfacial polymerization process.

Embodiment 37. The method of Embodiment 31, wherein the nanofiltration membrane is formed directly using a phase inversion process.

Embodiment 38. The method of any one of Embodiments 31-37, wherein the nanofiltration membrane removes at least 80% of the low molecular weight solubles in the first permeate stream.

Embodiment 39. The method of any one of Embodiments 18-38, wherein a temperature of the overflow stream and the first or second separation process is between about 25° C. and 65° C.

Embodiment 40. The method of any one of Embodiments 14-39, wherein a recovery stream comprises greater than 10% of low molecular weight proteins as originally comprised in the feed from the wet mill grain process.

Embodiment 41. The method of any one of Embodiments 14-40, wherein a recovery stream comprises about 1 to 99% of the prolamin contained in the feed from the wet mill grain process.

Embodiment 42. The method of Embodiment 41, wherein the first microporous membrane has a molecular weight cut-off (MWCO) in the range of 2,000 to 5,000.

Embodiment 43. The method of Embodiment 42, wherein the first microporous membrane has a MWCO less than 5,000.

Embodiment 44. The method of either Embodiment 42 or 43, wherein the second microporous membrane has a MWCO in the range of 2,000 to 5,000.

Embodiment 45. The method of either Embodiment 42 or 43, wherein the second microporous membrane has a MWCO less than 5,000.

Embodiment 46. A process integrated with a wet mill grain preprocess, comprising
receiving from the wet mill grain preprocess a stream as a feed to one or more separation processes which comprise at least an ultrafiltration process and a nanofiltration process;
subjecting said feed to said ultrafiltration process utilizing a microporous membrane to generate a first retentate stream comprising higher molecular weight proteins comprising glutens and a first permeate stream comprising prolamins, wherein the higher molecular weight proteins have an average molecular weight of greater than 75 kDa;
directing the first permeate stream to the nanofiltration process to generate a second retentate stream comprising lower molecular weight proteins comprising glutens and a second permeate stream comprising the prolamins, wherein the lower molecular weight proteins have an average molecular weight of less than about 75 kDa
recovering the prolamins from the second permeate stream; and
returning at least a portion of the second permeate stream to the wet mill grain preprocess.

Embodiment 47. The process of Embodiment 46, further comprising returning the first retentate stream to the wet mill grain preprocess or recovering from the first retentate stream the glutens.

Embodiment 48. The process of Embodiment 47, wherein the recovering the glutens comprises the use of a separation device and returning a liquid stream from the separation device to the wet mill grain preprocess.

Embodiment 49. The process of any one of Embodiments 46-48, further comprising returning the second retentate stream to the wet mill grain preprocess or recovering from the second retentate stream the glutens.

Embodiment 50. The process of Embodiment 49, wherein the recovering the glutens from the second retentate stream comprises the use of a separation device and returning a liquid stream from the separation device to the wet mill grain preprocess.

Embodiment 51. The process of any one of Embodiments 46-50, wherein the recovering of (d) comprise the use of a separation device comprising a spray dryer, decanter, centrifuge, filter, membrane element, or any combination thereof.

Embodiment 52. The process of any one of Embodiments 46-51, wherein the stream is from an overflow from a mechanical separation device.

Embodiment 53. The process of any one of Embodiments 46-52, wherein the nanofiltration process utilizes a nanofiltration membrane.

Embodiment 54. A process integrated with a wet mill grain preprocess, comprising: (a) receiving from the wet mill grain preprocess a stream as a feed to one or more filtration processes comprising at least a first membrane filtration process and a second membrane filtration process; (b) subjecting the feed to the first membrane filtration process utilizing a microporous membrane to generate a first retentate stream comprising higher molecular weight glutens having an average molecular weight of at least about 75 kDa and a first permeate stream comprising prolamins; (c) directing the first permeate stream to the second membrane filtration process to generate a second retentate stream comprising lower molecular weight glutens having an average molecular weight of less than about 75 kDa and a second permeate stream comprising the prolamins;
recovering the prolamins from the second permeate stream; and
returning at least a portion of the second permeate stream to the wet mill grain preprocess.

Embodiment 55. The process of Embodiment 54, further comprising returning the first retentate stream to the wet mill grain preprocess or recovering from the first retentate stream the higher molecular weight glutens.

Embodiment 56. The process of Embodiment 55, wherein the recovering the higher molecular weight glutens comprises the use of a separation device and returning a liquid stream from the separation device to the wet mill grain preprocess.

Embodiment 57. The process of any one of Embodiments 54-56, further comprising returning the second retentate stream to the wet mill grain preprocess or recovering from the second retentate stream the lower molecular weight glutens.

Embodiment 58. The process of Embodiment 57, wherein the recovering the lower molecular weight glutens from the second retentate stream comprises the use of a separation device and returning a liquid stream from the separation device to the wet mill grain preprocess.

Embodiment 59. The process of any one of Embodiments 54-58, wherein the recovering of (d) comprise the use of a separation device comprising a spray dryer, decanter, centrifuge, filter, membrane element, or any combination thereof.

Embodiment 60. The process of any one of Embodiments 54-59, wherein the stream is from an overflow stream from a mechanical separation device.

Embodiment 61. The process of any one of Embodiments 54-60, wherein the wet mill grain preprocess is a corn, wheat, barley, rye, sorghum or oat wet mill preprocess.

Embodiment 62. The process of any one of Embodiments 54-61, wherein the wet mill grain preprocess is a steep process.

Embodiment 63. The process of any one of Embodiments 60-62, wherein the overflow stream from the mechanical separation device in the wet mill grain preprocess is an overflow from a thickener, decanter or centrifuge or a filtrate from a filter.

Embodiment 64. The process of any one of Embodiments 54-63, wherein the total solids contained in an overhead stream from the wet mill grain preprocess contains less than 5% solids.

Embodiment 65. The process of any one of Embodiments 54-64, wherein the stream from the wet mill grain preprocess is in fluid communication with the microporous membrane utilized in the first membrane filtration process and the first retentate stream is in fluid communication with the wet mill grain preprocess or at least one separation device.

Embodiment 66. The process of Embodiment 65, wherein a liquid stream from the at least one separation device is in fluid communication with the wet mill grain preprocess.

Embodiment 67. The process of any one of Embodiments 54-66, wherein the first permeate stream from the first membrane filtration process is in fluid communication with a nanofiltration membrane utilized in the second membrane filtration process.

Embodiment 68. The process of Embodiment 67, wherein the second retentate stream from the nanofiltration membrane is in fluid communication with the wet mill grain process or at least one separation device.

Embodiment 69. The process of Embodiment 68, wherein a liquid stream from the at least one separation device in the second membrane filtration process is in fluid communication with the wet grain preprocess.

Embodiment 70. The process of any one of Embodiments 54-69, wherein recovery of a stream comprising prolamins is increased by removal of a stream comprising glutens.

Embodiment 71. The process of any one of Embodiments 54-70, further comprising recovering one or more protein species or non-protein species from at least one of (i) the first retentate stream, (ii) the first permeate stream, (iii) the second retentate stream, and (iv) the second permeate stream.

Embodiment 72. The process of Embodiment 71, wherein the recovered protein species comprise glutelins, prolamins, or glutens.

Embodiment 73. The process of Embodiment 71 or 72, wherein the recovered non-protein species comprise carbohydrates, starches, enzymes, alcohols, aldehydes, fats, or other low molecular weight organic species.

Embodiment 74. The process of any one of Embodiments 72-73, wherein the second retentate stream and the second permeate stream comprising the glutens and prolamins from the second membrane filtration process are recovered by centrifugation, spray-drying, decanting, filtration, or an additional membrane step.

Embodiment 75. The process of any one of Embodiments 54-74, wherein the recovered prolamins are further purified to provide high molecular weight prolamin products having an average molecular weight of between about 10 kDa and about 50 kDa Embodiment 76. The process of any one of Embodiments 54-75, wherein the microporous membrane is a low fouling spiral wound membrane comprising at least one polysulfone, polyethersulfone, or polyvinyl difluoride membrane element.

Embodiment 77. The process of Embodiment 76, wherein a nominal pore size range for the microporous membrane is equal to or between 0.1 and 2 microns.

Embodiment 78. The process of Embodiment 77, wherein a nominal pore size range for the microporous membrane is equal to or between 0.05 and 0.20 microns.

Embodiment 79. The process of any one of Embodiments 54-78, wherein the first membrane filtration process or the second membrane filtration process comprises elements having spacers of equal to or between 30 and 270 mils thickness.

Embodiment 80. The process of any one of Embodiments 54-79, wherein the first retentate stream comprises at least 90% of insoluble particulates greater than 0.5 micron in diameter.

Embodiment 81. The process of any one of Embodiments 54-80, wherein a reject stream from the microporous membrane comprises equal to or between 5.0% and 70 wt % of the high molecular weight solubles and fine particulates larger than 0.5 microns in diameter.

Embodiment 82. The process of any one of Embodiments 54-81, wherein the second membrane filtration process utilizes a nanofiltration membrane which is a low fouling spiral wound membrane comprised of at least one of polysulfone, polyvinyl difluoride, polyethersulfone, polyacrylonitrile, and polyetherimide.

Embodiment 83. The process of Embodiment 82, wherein the nanofiltration membrane is a low fouling spiral wound membrane comprised of at least one of polysulfone or polyvinyl difluoride.

Embodiment 84. The process of Embodiment 82 or 83, wherein a nominal pore size of the nanofiltration membrane is less than or equal to 10 nm.

Embodiment 85. The process of any one of Embodiments 82-84, wherein a nominal pore size of the nanofiltration membrane is less than or equal to 5 nm.

Embodiment 86. The process of any one of Embodiments 82-85, wherein the nanofiltration membrane is a thin film composite membrane.

Embodiment 87. The process of Embodiment 86, wherein the thin film composite membrane comprises a microporous membrane substrate with pore size in the range of 0.05 to 0.2 microns.

Embodiment 88. The process of Embodiment 86 or 87, wherein the thin film composite membrane comprises a top nanoporous polymer layer of pore size less than 20 nm or with a molecular weight cut-off less than 5000.

Embodiment 89. The process of any one of Embodiments 86-88, wherein the thin film composite membrane comprises a top nanoporous polymer layer produced by a dip-coating or interfacial polymerization process.

Embodiment 90. The process of any one of Embodiments 86-89, wherein the thin film composite membrane is formed directly using a phase inversion process.

Embodiment 91. The process of any one of Embodiments 82-90, wherein the nanofiltration membrane removes at least 80% of the low molecular weight solubles in the first permeate stream.

Embodiment 92. The process of any one of Embodiments 82-91, wherein base materials selected for the microporous and nanofiltration membranes are the same or different.

Embodiment 93. The process of any one of Embodiments 60-92, wherein a temperature of the overflow stream from the wet mill grain preprocess and the one or more filtration processes are in the range of 25° C. to 65° C.

Embodiment 94. The process of any one of Embodiments 54-93, wherein the prolamin recovered is equal to or between 1 and 99% of prolamin contained in the feed.

Embodiment 95. A membrane protein recovery system integrated with a wet mill grain system, the membrane protein recovery system comprising: (a) at least one gluten starch separator; (b) at least one gluten thickener; (c) at least one grain steeping vessel; and (d) at least two spiral wound membranes; wherein at least one of the at least two spiral wound membranes is in fluid contact with the at least one gluten thickener; and wherein at least one of the at least two spiral wound membranes or the at least one gluten starch separator is in fluid contact with the at least one grain steeping vessel.

Embodiment 96. The membrane protein recovery system of Embodiment 95, further comprising at least one microporous membrane in fluid contact with the at least one gluten thickener.

Embodiment 97. The membrane protein recovery system of Embodiment 95 or 96, further comprising a separation device in fluid communication with the at least one gluten thickener.

Embodiment 98. The membrane protein recovery system of any one of Embodiments 95-97, further comprising a separation device in fluid contact with the at least one grain steeping vessel.

Embodiment 99. The membrane protein recovery system of any one of Embodiments 95-98, further comprising a spray-drying device in fluid contact with the at least one grain steeping vessel, or at least one of the at least two spiral wound membranes.

Embodiment 100. A method for processing a feed stream, comprising: (a) providing said feed stream comprising a first set of proteins having an average molecular weight of greater than kDa and a second set of proteins having an average molecular weight of less than or equal to kDa, which second set of proteins comprises a gluten and a prolamin; (b) bringing said feed stream in contact with a first membrane under conditions sufficient to provide (i) a first retentate stream comprising said first set of proteins and (ii) a first permeate stream comprising said second set of proteins; and (c) bringing said first permeate stream in contact with a second membrane under conditions sufficient to provide a second retentate stream comprising said gluten and a second permeate stream comprising said prolamin.

Embodiment 101. The method of Embodiment 13, wherein said first membrane comprises pores having a first average pore size and said second membrane comprises pores having a second average pore size, where said first average pore size is greater than said second average pore size.

Embodiment 102. The method of Embodiment 100 or 101, wherein said feed stream is generated from a wet mill grain process.

Embodiment 103. The method of any one of Embodiments 100-102, wherein a grain feed of said wet mill grain process comprises corn, wheat, barley, rye, oats, or rice.

Embodiment 104. The method of any one of Embodiments 100-103, wherein said feed stream is supplied from a mechanical separation device or a gravity separation device.

Embodiment 105. The method of any one of Embodiments 100-104, wherein said first membrane is a spiral wound membrane.

Embodiment 106. The method of any one of Embodiments 100-105, wherein said second membrane is a spiral wound membrane.

Embodiment 107. The method of any one of Embodiments 100-106, wherein said feed stream is an aqueous stream with no added organic solvent.

Embodiment 108. The method of any one of Embodiments 100-107, wherein said first membrane comprises one or more of polysulfone, polyvinyl difluoride, polyethersulfone, polyacrylonitrile, and polyetherimide.

Embodiment 109. The method of any one of Embodiments 100-108, wherein said second membrane comprises one or more of polysulfone, polyvinyl difluoride, polyethersulfone, polyacrylonitrile, and polyetherimide Embodiment 110. The method of any one of Embodiments 100-109, wherein said second membrane comprises a microporous membrane substrate and a top interfacial cross-linked polyamide layer.

Embodiment 111. The method of any of one of Embodiments 100-110, wherein said first set of proteins has an average molecular weight of greater than 100 kDa.

Embodiment 112. The method of any one of Embodiments 100-110, wherein said first set of proteins has an average molecular weight of between about 75 kDa and 100 kDa.

Embodiment 113. The method of any one of Embodiments 100-112, wherein said first membrane is a spiral wound membrane comprising at least one spacer element with a thickness between about 30 mils and 135 mils.

Embodiment 114. The method of any one of Embodiments 101-113, wherein said first average pore size is between about 0.02 micrometers and about 0.5 micrometers.

Embodiment 115. The method of any one of Embodiments 101-114, wherein said second average pore size is less than about 50 nanometers.

Embodiment 116. The method of any one of Embodiments 101-115, wherein said second average pore size is less than about 20 nanometers.

Embodiment 117. The method of any one of Embodiments 100-116, wherein said first membrane has an average molecular weight cut off of between about 2 kDa and about 500 kDa.

Embodiment 118. The method of any one of Embodiments 100-117, wherein said first membrane has an average molecular weight cut off of between about 100 kDa and about 200 kDa.

Embodiment 119. The method of any one of Embodiments 100-118, wherein said feed stream further comprises fine particulates, and said first retentate stream comprises between about 5% to 70% of said fine particulates greater than 0.5 micrometers in diameter.

Embodiment 120. The method of any one of Embodiments 100-119, wherein said feed stream comprises insoluble particulates and said first retentate stream comprises at least 90% of said insoluble particulates greater than 0.5 micrometers in diameter.

EXAMPLES

The following examples are included to further describe some aspects of the present disclosure and should not be used to limit the scope of the disclosure.

Membrane Preparation

In some examples, a microporous membrane was made from polyvinyldifluoride (PVDF) using a phase inversion method, by casting a polymer solution with PVDF, polyvinylpyrrolidone in N-methyl pyrrolidone. The PVDF membrane had a mean pore size of 0.1-0.2 micron. A nanofiltration membrane was made using an interfacial polymerization method, by firstly dip-coating an aqueous solution of piperazine and then followed by dip-coating a solution of trimesoyl chloride in isopar G to form a cross-linked polyamide layer on top of a microporous polysulfone membrane. The nanofiltration membrane had a molecular weight cut-off (MWCO) less than 5000.

Membrane Stamp Test

In the first separation process (e.g., ultrafiltration), a PVDF membrane stamp of 47 mm in diameter was cut and mounted in a permeation system containing a stirred test cell. A feed solution with an insoluble solids level of about 4 wt % was introduced into the cell, and the permeate flux was measured at a feed pressure of 50 psig and a feed temperature of 23° C. The membrane stamp had a pressure and temperature normalized permeate flux of at least 2.6 LMH/bar. The permeate was a slightly yellow clear liquid. This ultrafiltration process may reject (in retentate) about 50% of soluble proteins in the feed.

In the second separation process, a nanofiltration membrane stamp of 47 mm in diameter was cut and mounted in a permeation system containing a stirred test cell. The permeate solution from the above ultrafiltration process was introduced into the cell, and the permeate flux was measured at a feed pressure of 50 psig and a feed temperature of 23° C. The membrane stamp had a pressure and temperature normalized permeate flux of 2.5 LMH/bar. The permeate was a colorless clear liquid. A protein rejection rate (in retentate) of 90% was achieved using this nanofiltration process. Upon standing, some white precipitate was found to develop in the NF permeate as well as in the UF permeate. Upon analysis using FTIR, the white precipitate was identified to be Corn Zein (prolamin).

In some examples, the zein solubility (prolamin solubility) may be dependent on the presence of other species, including glutens. In one example, once these other species were removed by the membrane processes of the present disclosure, a portion of the zein precipitated as a white powder, due to its limited solubility in aqueous streams. In some examples, dilution of the membrane process stream (e.g. the feed stream) with water can also result in precipitation of zein.

Some examples demonstrate the benefits of membrane fractionation using corn gluten rotary vacuum filter (RVF filtrate) and Merco gluten thickener overflow samples (MST) from a wet mill corn process. In a first ultrafiltration step, macro particles in the range of 0.5-10 microns were rejected (in the retentate), mostly high molecular weight glutens. In the second nanofiltration step low molecular weight glutens were rejected (in the retentate) and a stream comprising zein protein separated (from the permeate). Removal of the glutens resulted in precipitation of a portion of the corn zein, thus facilitating recovery of the zein.

One example protocol includes: providing gluten sources from 1) a gluten thickener overflow and 2) a rotary vacuum filter filtrate; receiving a liquid sample from the gluten sources, wherein the liquid sample is a suspension with yellow particulates settling at the bottom and a yellowish-clear solution on top; depositing the liquid sample in a 400 mL Amicon cell with applied $N_2$ pressure and magnetic stirring; removing yellow particulates with a coarse membrane (PE400); subjecting remaining solution to a polyethylene (PE) material, nanofiltration membrane; and collecting a clear permeate, wherein a white precipitate begins collecting after the membrane fractionation.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method of recovering fine particulate or protein species from a feed from a wet mill grain process, said method comprising:
   (a) subjecting the feed from the wet mill grain process to a first separation process utilizing a first membrane under conditions effective to provide a first retentate stream comprising one or more higher molecular weight proteins having an average molecular weight of greater than about 75 kilodalton and a first permeate stream comprising one or more lower molecular weight proteins having an average molecular weight of less than about 75 kilodalton; and
   (b) subjecting the first permeate stream to a second separation process utilizing a second membrane under conditions effective to provide a second retentate stream comprising glutens and a second permeate stream comprising prolamins.

2. The method of claim 1, wherein the one or more lower molecular weight proteins comprise glutens or prolamins.

3. The method of claim 1, wherein the one or more higher molecular weight proteins comprise glutens.

4. The method of claim 1, further comprising directing the second permeate stream to pass through a nanofiltration membrane unit to recover protein species comprising prolamins.

5. The method of claim 2, wherein recovery of a stream comprising prolamins is increased by removal of a stream comprising glutens.

6. The method of claim 1, further comprising recovering one or more protein species or one or more non-protein species selected from at least one of (i) the first retentate stream, (ii) the first permeate stream, (iii) the second retentate stream, and (iv) the second permeate stream.

7. The method of claim 6, wherein the recovered one or more protein species comprise glutelins, prolamins, or glutens.

8. The method of claim 6, wherein recovered one or more non-protein species comprise carbohydrates, starches, enzymes, alcohols, aldehydes, fats, or other low molecular weight organic species.

9. The method of claim 1, wherein the first separation process or the second separation process is operated at a feed pressure of about 15 pounds per square inch gauge to about 200 pounds per square inch gauge.

10. The method of claim 1, wherein the first membrane has a molecular weight cut-off in the range of about 2,000 Dalton to about 5,000 Dalton.

11. The method of claim 1, wherein the second membrane has a molecular weight cut off in the range of about 2,000 Dalton to about 5,000 Dalton.

12. A process integrated with a wet mill grain preprocess, comprising
   (a) receiving from the wet mill grain preprocess a stream as a feed to one or more separation processes which comprise at least an ultrafiltration process and a nanofiltration process;
   (b) subjecting said feed to said ultrafiltration process utilizing a microporous membrane to generate a first retentate stream comprising higher molecular weight proteins comprising glutens and a first permeate stream comprising prolamins, wherein the higher molecular weight proteins have an average molecular weight of greater than about 75 kilodalton;
   (c) directing the first permeate stream to the nanofiltration process to generate a second retentate stream comprising lower molecular weight proteins comprising glutens and a second permeate stream comprising the prolamins, wherein the lower molecular weight proteins have an average molecular weight of less than about 75 kilodalton;

(d) recovering the prolamins from the second permeate stream; and (e) returning at least a portion of the second permeate stream to the wet mill grain preprocess.

13. The process of claim 12, further comprising returning the first retentate stream to the wet mill grain preprocess or recovering the glutens from the first retentate stream.

14. A method for processing a feed stream, comprising:
(a) providing said feed stream comprising a first set of proteins having an average molecular weight of greater than about 75 kilodalton and a second set of proteins having an average molecular weight of less than or equal to about 75 kilodalton, which second set of proteins comprises a gluten and a prolamin;
(b) bringing said feed stream in contact with a first membrane under conditions sufficient to provide (i) a first retentate stream comprising said first set of proteins and (ii) a first permeate stream comprising said second set of proteins; and
(c) bringing said first permeate stream in contact with a second membrane under conditions sufficient to provide a second retentate stream comprising said gluten and a second permeate stream comprising said prolamin.

15. The method of claim 14, wherein said first membrane comprises pores having a first average pore size and said second membrane comprises pores having a second average pore size, where said first average pore size is greater than said second average pore size.

16. The method of claim 14, wherein said first membrane comprises a spiral wound membrane.

17. The method of claim 14, wherein said second membrane comprises a spiral wound membrane.

18. The method of claim 14, wherein said feed stream comprises an aqueous stream with no added organic solvent.

19. The method of claim 14, wherein said first membrane comprises one or more selected from the group consisting of polysulfone, polyvinyl difluoride, polyethersulfone, polyacrylonitrile, and polyetherimide.

20. The method of claim 14, wherein said second membrane comprises one or more selected from the group consisting of polysulfone, polyvinyl difluoride, polyethersulfone, polyacrylonitrile, and polyetherimide.

* * * * *